United States Patent
Piotti et al.

(10) Patent No.: US 12,216,059 B2
(45) Date of Patent: Feb. 4, 2025

(54) METHOD FOR MANUFACTURING SURFACE ENHANCED RAMAN SPECTROSCOPY TAGS

(71) Applicant: SICPA HOLDING SA, Prilly (CH)

(72) Inventors: Marcelo Eduardo Piotti, Albuquerque, NM (US); Raymond H. Scheffler, Alexandria, VA (US); Mark Kowalski, Albuquerque, NM (US)

(73) Assignee: SICPA HOLDING SA, Prilly (CH)

( * ) Notice: Subject to any disclaimer, the term of this patent is extended or adjusted under 35 U.S.C. 154(b) by 578 days.

(21) Appl. No.: 17/627,525

(22) PCT Filed: Jul. 13, 2020

(86) PCT No.: PCT/EP2020/069684
§ 371 (c)(1),
(2) Date: Jan. 14, 2022

(87) PCT Pub. No.: WO2021/009090
PCT Pub. Date: Jan. 21, 2021

(65) Prior Publication Data
US 2022/0268705 A1 Aug. 25, 2022

Related U.S. Application Data

(60) Provisional application No. 62/874,158, filed on Jul. 15, 2019.

(30) Foreign Application Priority Data

Aug. 16, 2019 (EP) ..................................... 19192040
Mar. 18, 2020 (EP) ..................................... 20163879

(51) Int. Cl.
*G01N 21/01* (2006.01)
*B01J 13/00* (2006.01)
*G01N 21/65* (2006.01)

(52) U.S. Cl.
CPC ........ *G01N 21/658* (2013.01); *B01J 13/0034* (2013.01); *B01J 13/0039* (2013.01)

(58) Field of Classification Search
CPC ... G01N 21/658; G01N 21/01; B01J 13/0034; B01J 13/0039; B82Y 10/00; B82Y 20/00; B82Y 40/00
See application file for complete search history.

(56) References Cited

U.S. PATENT DOCUMENTS

| 8,497,131 B2 | 7/2013 | Natan et al. |
| 9,802,818 B2 | 10/2017 | Tyler et al. |

(Continued)

FOREIGN PATENT DOCUMENTS

| CN | 103364392 | 10/2013 |
| JP | 2005507500 | 3/2005 |

(Continued)

OTHER PUBLICATIONS

Japanese Office Action in counterpart Japanese Application No. JP2022-502101 dated Feb. 27, 2024 (and English language translation of Office Action).

(Continued)

*Primary Examiner* — Robert S Jones, Jr.
*Assistant Examiner* — Jiangtian Xu
(74) *Attorney, Agent, or Firm* — Muncy, Geissler, Olds & Lowe, P.C.

(57) ABSTRACT

The present invention relates to the field of methods of manufacturing of surface enhanced Raman spectroscopy (SERS) tags. The manufacturing method according to the present invention is reproducible and versatile and enables the production in an expedient manner of high quantities of SERS tags characterized by a narrow size distribution and a high ratio of low-number aggregates. SERS tags manufac- (Continued)

tured by the inventive manufacturing method described herein provide increased ensemble SERS responses.

18 Claims, 7 Drawing Sheets

(56) References Cited

U.S. PATENT DOCUMENTS

| | | | |
|---|---|---|---|
| 2005/0142567 A1 | 6/2005 | Su et al. | |
| 2006/0038979 A1 | 2/2006 | Natan et al. | |
| 2008/0003576 A1 | 1/2008 | Zhang et al. | |
| 2008/0081340 A1 | 4/2008 | Patwardhan et al. | |
| 2008/0118986 A1* | 5/2008 | Burrell | B82Y 15/00 436/166 |
| 2009/0140206 A1 | 6/2009 | Nie et al. | |
| 2012/0156491 A1 | 6/2012 | Tam et al. | |
| 2016/0327551 A1 | 11/2016 | Mehrpouyan et al. | |
| 2018/0015188 A1* | 1/2018 | Sun | A61N 5/1077 |

FOREIGN PATENT DOCUMENTS

| | | |
|---|---|---|
| JP | 2007502716 | 2/2007 |
| JP | 2018132350 | 8/2018 |
| WO | 2011119589 | 9/2011 |
| WO | 2016059429 | 4/2016 |
| WO | 2016086999 | 6/2016 |

OTHER PUBLICATIONS

First Examination Report (Office Action) issued in counterpart Indian Application No. 202217006649 dated Mar. 22, 2023.
Wustholz et al., "Structure-Activity Relationships in Gold Nanoparticle Dimers and Trimers for Surface-Enhanced Raman Spectroscopy," J. Am. Chem. Soc. 2010, 132, 10903-10910.
Ruan et al., "Growth of Monodisperse Gold Nanospheres with Diameters from 20 nm to 220 nm and Their Core/Satellite Nanostructures," Adv. Optical Mater. 2014, 2, 65-73.
Yoon et al., "Controlled Assembly and Plasmonic Properties of Asymmetric Core-Satellite Nanoassemblies," ACS Nano, 2012, 8, 7199-7208.
Haiss et al., "Determination of Size and Concentration of Gold Nanoparticles from UV-Vis Spectra," Anal. Chem., 2007, 79, 4215-4221.
Chan et al., "Surface-Enhanced Raman Spectroscopy Characterization of Salt-Induced Aggregation of Gold Nanoparticle," ChemPhysChem 2018, 19, 24-28.
International Search Report and Written Opinion issued with respect to application No. PCT/EP2020/069684.

* cited by examiner

METHOD FOR MANUFACTURING SURFACE ENHANCED RAMAN SPECTROSCOPY TAGS

FIELD OF THE INVENTION

The present invention relates to the field of methods of manufacturing of surface enhanced Raman spectroscopy (SERS) tags. The manufacturing method according to the present invention is reproducible and versatile and enables the production in an expedient manner of high quantities of SERS tags characterized by a narrow size distribution and a high ratio of low-number aggregates. SERS tags manufactured by the inventive manufacturing method described herein provide increased ensemble SERS responses.

BACKGROUND OF THE INVENTION

Surface enhanced Raman spectroscopy (SERS) tags have proved useful for a variety of applications including product labelling for identification and authentication purposes, and high-throughput multiplex screening in microarray technology, diagnosis and bioimaging. SERS tags are aggregates of nanoparticles presenting a plasmonic surface and having Raman active reporter molecules adsorbed on their surface. The nanoparticles presenting a plasmonic surface are responsible for the generation of the electric field required for the Raman amplification, while the Raman active reporter molecule provides the unique vibrational fingerprint of the SERS tag. Typically, the aggregates present an external coating layer which a) isolates the SERS tag from the external medium thereby, preventing the Raman active reporter molecules from leaching out from the SERS tag and protecting the SERS tag from contaminations of the external medium that may give rise to vibrational noise, b) increases the colloidal stability of the SERS tag, and c) provides a convenient surface for further chemical functionalization. To date, polymers and silica have been employed as external coating layers.

Due to the strong dependence of plasmonic properties on nanoparticle aggregation states, the production of SERS tags with a high population of low-number aggregates is highly desirable for obtaining increased ensemble SERS responses. SERS tags with a high population of low-number aggregates were produced either via post-synthetic sorting techniques, or via controlled aggregation synthetic processes.

For example, field flow fractionation applied to a mixture containing single nanoparticles and nanoparticle aggregates from dimers to octamers resulted in the production of a fraction enriched with dimer (10%), trimer (21%) and tetramer (13%) SERS tags, but which however contained a high percentage of single nanoparticles (52%) (*J. Am. Chem. Soc.* 2010, 132, 10903-10910). A mixture containing single nanoparticles and aggregates from dimers to dodecamers was enriched in dimer (52%) and trimer (32%) SERS tags by using a centrifugal post-synthetic sorting method in a high viscosity density gradient medium, such as aqueous iodixanol density gradient medium (U.S. Pat. No. 9,802,818B2). Besides being time-consuming and expensive, the post-synthetic sorting techniques require the use of harsh conditions (for e.g. high viscosity reagents) that lead to destabilization of uncoated SERS tags. Thus, post-synthetic sorting techniques are compatible only with silica- or polymer-coated SERS tags. Therefore, controlled aggregation synthetic processes are of great advantage for the production of SERS tags with narrow size distribution and high ratio of low-number aggregates.

Solid support assisted aggregation allowed the production of SERS tags with a narrow size distribution. Ruan et al. (*Adv. Optical Mater.* 2014, 2, 65-73) described the synthesis of asymmetric core-satellites SERS tags having a number of 18±2 Au nanosphere satellites of 24 nm average diameter per Au nanosphere core of 180 nm average diameter. The synthesis involves the adsorption of cetyltrimethylammonium bromide stabilized Au nanoparticle cores on a indium tin oxide coated glass slide or a silicon wafer, followed by immersion of the functionalized solid support in a solution of 4-aminothiophenol in water/acetonitrile to adsorb the Raman active reporter molecule on the surface of the Au nanoparticles, and subsequent immersion for 1 hour in a suspension of Au nanoparticles with an average diameter of 24 nm. The aggregation state of the SERS tags can be controlled by controlling the immersion time of the functionalized solid support in the suspension of Au nanoparticle satellites and/or decreasing the concentration of Au nanoparticle satellites in said suspension. The method described by Ruan et al. relies upon the use of cetyltrimethylammonium bromide surfactant for stabilizing the Au colloid, which decreases significantly the surface available for the adsorption of the Raman active reporter molecule on the Au nanoparticle core, and thereby the intensity of the SERS signal provided by the SERS tags. To tether the Au nanoparticle satellites to the Au nanoparticle core, the aggregation method employs Raman active reporter molecules presenting two functionalities with affinity for the Au surface. Hence, the method is applicable only for production of SERS tags having Raman active reporter molecules presenting two functionalities with affinity for the Au surface, which represents a high limitation in terms of Raman active reporter molecules to be used as SERS tag fingerprint. Moreover, said method involves long reaction times and is not suitable for the expedient production of high quantities of SERS tags.

A further solid support assisted assembly method of SERS tags of narrow size distribution was described by Yoon et al. (*ACS Nano* 2012, 8, 7199-7208). The method is based on the size-dependent desorption propensities of Au nanoparticles adsorbed on amino-functionalized glass slides and the use of alkanedithiols for tethering the Au nanoparticle satellites to the Au nanoparticle core. SERS tags having 13±3 Au nanoparticle satellites of 13 nm average diameter per Au nanoparticle core of 51 nm average diameter were produced. The method developed by Yoon et al. appears to enable the incorporation of any Raman active reporter molecule in the SERS tag. However, said method presents limitations in terms of sizes of Au nanoparticle that can be used and surface on the Au nanoparticle core accessible to the Raman active reporter molecules. Moreover, the method requires long reaction times and is not suitable for the expedient production of high quantities of SERS tags.

Thus, a need remains for reproducible, cost-efficient and versatile methods of manufacturing of SERS tags, which enable the production in an expedient manner of high quantities of SERS tags characterized by a narrow size distribution and a high ratio of low-number aggregates. SERS tags with a high population of low-number aggregates are highly desirable for obtaining increased ensemble SERS responses.

SUMMARY OF THE INVENTION

Accordingly, it is the object of the present invention to provide a versatile, cost-efficient and reproducible method of manufacturing SERS tags that enables the production in an expedient manner of high quantities of SERS tags characterized by a narrow size distribution and a high ratio of low-number aggregates. This is achieved by a method for manufacturing surface enhanced Raman spectroscopy (SERS) tags, preferably SERS tags for use as a security element, comprising the steps:

a) providing a first colloid consisting essentially of nanoparticles having a plasmonic surface and substantially same size dispersed in an aqueous solvent, and a stabilizing agent adsorbed on the surface of said nanoparticles, and having a $\zeta$-potential value lower than or equal to −25 mV;

b) providing a second colloid consisting essentially of nanoparticles having a plasmonic surface and substantially same size dispersed in an aqueous solvent, Raman active reporter molecules adsorbed on the surface of said nanoparticles, and a stabilizing agent adsorbed on the surface of said nanoparticles, and having a $\zeta$-potential value lower than or equal to −25 mV;

c) combining the first colloid with the second colloid so that the ratio between the number of nanoparticles of the first colloid and the number of nanoparticles of the second colloid is of between about 25:1 to about 1:1, preferably from about 5:1 to about 1:1, more preferably from 4:1 to about 3:1 to provide a third colloid;

d) inducing aggregation of the nanoparticles by any of the steps d1)-d3) or a combination thereof:
  d1) mixing the third colloid obtained at step c) at a pH comprised between about 2.2 and the lowest pH value at which the Raman active reporter molecules have a net electrical charge of between 0 and 0.3;
  d2) addition of a salt solution, preferably an inorganic salt solution, to the third colloid obtained at step c);
  d3) addition of a water-miscible solvent to the third colloid obtained at step c); and e) stopping aggregation.

Preferably, step b) in the method claimed and described herein comprises the following steps conducted in the order b1) to b3):

b1) providing a colloid consisting essentially of nanoparticles having a plasmonic surface and substantially same size dispersed in an aqueous solvent, and a stabilizing agent adsorbed on the surface of said nanoparticles, and having a $\zeta$-potential value lower than or equal to −25 mV;

b2) adjusting the pH of the colloid at the lowest pH value at which the Raman active reporter molecules to be adsorbed on the surface of the nanoparticles carry no net electrical charge while maintaining the $\zeta$-potential value lower than or equal to −25 mV, preferably lower than −40 mV; and b3) adding a solution of the Raman active reporter molecules in a solvent to the colloid obtained at step b2) while maintaining the $\zeta$-potential value lower than or equal to −25 mV.

In a further preferred embodiment, steps c) and d) are conducted simultaneously in a continuous flow system. In a further preferred embodiment, the nanoparticles size in the first colloid is different from the nanoparticles size in the second colloid.

As illustrated by the examples E1-E14, the method claimed herein allows the integration of a variety of Raman active reporter molecules in the SERS tag and is not limited to combination of specific sizes of nanoparticles, enabling also the synthesis of SERS tags comprising nanoparticles having the same size as attested for e.g. by examples E1-E8, and E12-E14. Further, the manufacturing method claimed and described herein provides SERS tags with narrow size distribution as illustrated for e.g. by FIG. 3a and FIG. 3b and a high ratio of low-number aggregates as illustrated for e.g. by FIG. 3a and FIG. 3b and has significantly shorter reaction time compared to the methods known in the literature.

BRIEF DESCRIPTION OF FIGURES

FIG. 2a shows the variation of the SERS intensity with the aggregation reaction time for SERS tags manufactured as described in Example E1; FIG. 2b shows the variation of the SERS intensity with the aggregation reaction time for SERS tags manufactured as described in Example E14; FIG. 2c shows the variation of the SERS intensity with the aggregation reaction time for SERS tags manufactured as described in Example E13. The horizontal axis corresponds to the aggregation reaction time in seconds, and the vertical axis corresponds to the SERS response with 785 nm excitation. The reported SERS intensity was measured with 100 ms integration time every 1 second at the given gold concentration, and this signal intensity has been correlated to samples diluted to 12.5 µg Au/mL and scanned at 1 second integration.

DETAILED DESCRIPTION

Definitions

Figure 1A:
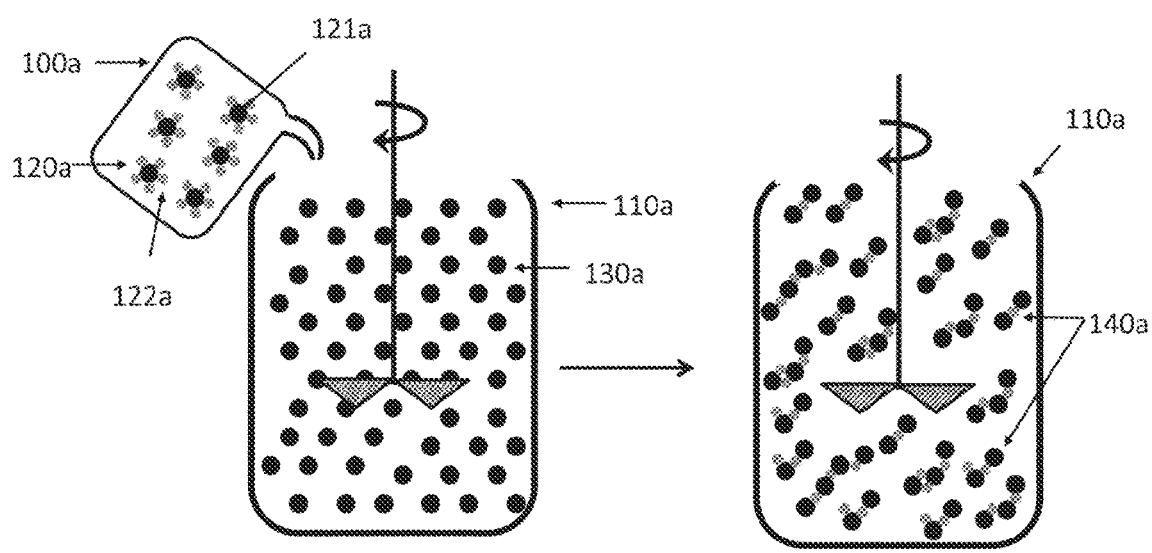
FIG. 1a schematically represents a manufacturing method of SERS tags according to the present invention. The manufacturing method includes combining a second colloid (120a) consisting essentially of nanoparticles with a plasmonic surface and substantially same size (121a) dispersed in an aqueous solvent (not shown), wherein the nanoparticles have adsorbed on their surface Raman active reporter molecules (122a) and a stabilizing agent (not shown) with a first colloid consisting essentially of nanoparticles with a plasmonic surface and substantially same size (130a) dispersed in an aqueous solvent (not shown), wherein the nanoparticles have adsorbed on their surface a stabilizing agent (not shown), and inducing aggregation of the nanoparticles to provide SERS tags (140a).

The following definitions are to be used to interpret the meaning of the terms discussed in the description and recited in the claims.

As used herein, the article "a/an" indicates one as well as more than one, and does not necessarily limit its referent noun to the singular.

As used herein, the term "at least" is meant to define one or more than one, for example one or two or three.

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B and optionally C" may also (essentially) consists of A and B, or (essentially) consists of A, B and C.

Where the present description refers to "preferred" embodiments/features, combinations of these "preferred" embodiments/features shall also be deemed as disclosed as long as this combination of "preferred" embodiments/features is technically meaningful.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

Surprisingly it was found that a method for manufacturing surface enhanced Raman spectroscopy (SERS) tags, preferably SERS tags for use as a security element, comprising the steps:

a) providing a first colloid consisting essentially of nanoparticles having a plasmonic surface and substantially same size dispersed in an aqueous solvent, and a stabilizing agent adsorbed on the surface of said nanoparticles, and having a $\zeta$-potential value lower than or equal to −25 mV;

b) providing a second colloid consisting essentially of nanoparticles having a plasmonic surface and substantially same size dispersed in an aqueous solvent, Raman active reporter molecules adsorbed on the surface of said nanoparticles, and a stabilizing agent adsorbed on the surface of said nanoparticles, and having a $\zeta$-potential value lower than or equal to −25 mV;

c) combining the first colloid with the second colloid so that the ratio between the number of nanoparticles of the first colloid and the number of nanoparticles of the second colloid is of between about 25:1 to about 1:1, preferably from about 5:1 to about 1:1, more preferably from about 4:1 to about 3:1 to provide a third colloid;
d) inducing aggregation of the nanoparticles by any of the steps d1)-d3) or a combination thereof:
  d1) mixing the third colloid obtained at step c) at a pH comprised between about 2.2 and the lowest pH value at which the Raman active reporter molecules have a net electrical charge of between 0 and 0.3;
  d2) addition of a salt solution, preferably an inorganic salt solution, to the third colloid obtained at step c);
  d3) addition of a water-miscible solvent to the third colloid obtained at step c); and
e) stopping aggregation;
provides in a cost-efficient and expedient manner high quantities of SERS tags with narrow size distribution and a high ratio of low-number aggregates. The method does not have any limitation in terms of Raman active reporter molecule to be used as fingerprint of the SERS tag or size of the nanoparticles having a plasmonic surface contained in the first and second colloid, thereby enabling the manufacturing of a variety of SERS tags.

As well known to the skilled person and used herein, a SERS tag comprises one aggregate of nanoparticles presenting a plasmonic surface and Raman active reporter molecules adsorbed on the surface of the nanoparticles. The nanoparticles presenting a plasmonic surface are responsible for the generation of the electric field required for the Raman amplification, while the Raman active reporter molecules provide the unique vibrational fingerprint of the SERS tag. A SERS tag may further comprise an external coating layer isolating the nanoparticles aggregate having adsorbed on the surface Raman active molecules from the external medium. Thus, the external coating layer a) isolates the SERS tag from the external medium thereby, preventing the Raman active reporter molecules from leaching out from the SERS tag and protecting the SERS tag from contaminations of the external medium that may give rise to spurious peaks, b) increases the colloidal stability of the SERS tag, and c) provides a convenient surface for further chemical functionalization. External coating layers include silica and polymers, such as poly(ethylene imine) (PEI), polystyrene-alt-maleic acid) sodium salt (PSMA), poly(diallyldimethylammonium chloride) (PDADMAC).

Owing to the exhibited SERS signal, the SERS tags obtained via the manufacturing method claimed and described herein are particularly useful as a security element for protecting documents and articles against counterfeit and illegal reproduction. As used herein, the term "security element" designates an element that can be incorporated into or applied to a security document or article for the purpose of determining its authenticity and protecting it against counterfeit and illegal reproduction. The security element may be an indicium, image, pattern or graphic element printed, coated or sprayed on a security element or article with an ink, a varnish or a coating composition containing the SERS tags obtained via the manufacturing method according to the present invention. Alternatively, the SERS tags may function as a security element when integrated in the substrate of a security document. The term "security document" and "security article" refers to a document or article having a value such as to render it potentially liable to attempts at counterfeiting or illegal reproduction and which is usually protected against counterfeit or fraud by at least one security feature. The term "security article" as used herein encompasses all articles that shall be protected against counterfeiting and/or illegal reproduction in order to warrant their content. Examples of security documents include without limitation value documents and value commercial goods. Typical examples of value documents include without limitation banknotes, deeds, tickets, checks, vouchers, fiscal stamps, tax labels, agreements and the like, identity documents such as passports, identity cards, visas, bank cards, credit cards, transaction cards, access documents, entrance tickets and the like. Value commercial goods encompass packaging material, in particular for cosmetic articles, nutraceutical articles, pharmaceutical articles, alcohols, tobacco articles, beverages or foodstuffs, electrical/electronics articles, fabrics or jewelry, i.e. articles that shall be protected against counterfeiting and/or illegal reproduction in order to warrant the content of the packaging like for instance genuine drugs. Packaging material examples include without limitation labels, such as authentication brand labels, tamper evidence labels and seals.

Within the meaning of the present invention, the term "nanoparticle" is defined as a single particle having a size corresponding to the maximum physical dimension (e.g.: length, diameter, etc.) in the range from 20±5 nm to 160±5 nm, preferably from 40±5 nm to 140±5 nm. The nanoparticle used in the present invention has a plasmonic surface i.e. the nanoparticle has an outer surface capable of enhancing the Raman scattering of a Raman active molecule. The outer surface of the nanoparticle is made of any known SERS-enhancing material. Preferably, the SERS-enhancing material is selected from: gold (Au), silver (Ag), copper (Cu), aluminum (Al), palladium (Pd), platinum (Pt) or a mixture or alloy thereof, and more preferably is gold (Au). The nanoparticle used in the present invention may be solid or hollow, and preferably solid. A solid nanoparticle may be made of a single material i.e. the SERS-enhancing material of the outer surface of the nanoparticle, or of more materials i.e. the material(s) of the core of the nanoparticle may be different from the SERS-enhancing material of the outer surface of the nanoparticle. A hollow nanoparticle is a nanoparticle whose core is a void space. The nanoparticle may have any shape capable of being produced. Preferably, the nanoparticle is a solid Au nanoparticle. Preferably, the nanoparticle has a shape selected from the group consisting of a sphere, spheroid, rod, disk, prism and cube, more preferably selected from a sphere and a spheroid, and even more preferably the nanoparticle has a spheroid shape.

As used herein, the wording "nanoparticles having substantially same size" means that said nanoparticles have a size corresponding to the maximal physical dimension (e.g.: length, diameter etc.) within ±20 nm, preferably within ±10 nm of the average size determined for said nanoparticles by electron microscopic methods, such as transmission electron microscopy (TEM) or scanning electron microscopy (SEM), or where applicable by the method of Haiss and coworkers (*Anal. Chem.* 2007, 79, 4215-4221).

The nanoparticles of the first colloid, second colloid and of the colloid provided at step b1) are dispersed in an aqueous solvent. As used herein, the term "aqueous solvent" refers to water and a mixture of water with one or more water-miscible solvents, wherein the water miscible solvent is preferably selected from the list comprising: methanol, ethanol, propanol, isopropanol, tetrahydrofuran, N-methyl-2-pyrrolidone (NMP), dimethyl sulfoxide (DMSO), N,N-dimethylformamide (DMF), acetone and acetonitrile.

The first colloid provided at step a) of the manufacturing method, the second colloid provided at step b) of the manufacturing method, as well as the colloid provided at step b1) of the manufacturing method do not contain polymers or surfactants for stabilization purposes. Colloids stabilization with polymers (for e.g.: polyvinylpyrrolidone) or surfactants (for e.g. cetyltrimethylammonium bromide) is well known in the art. However, as polymers and surfactants are added to the colloids prior to the addition of the Raman active reporter molecules, they significantly reduce the surface available on the nanoparticles for the adsorption of the Raman active reporter molecules and increase the spacing between colloid particles within an aggregate leading therefore to SERS tags exhibiting a lower SERS signal intensity. To circumvent this drawback, the first colloid, the second colloid, as well as the colloid provided at step b1) are surfactant-free and polymer-free.

The stabilizing agent adsorbed on the surface of the nanoparticles of the first colloid, second colloid and of the colloid provided at step b1) is preferably selected from carboxylic acids, carboxylic acid salts, phosphoric acids, phosphoric acid salts, ascorbic acid, ascorbic acid salts, and mixtures thereof. To avoid competition between the Raman active reporter molecules and the stabilizing agent during adsorption of the Raman active reporter molecules on the nanoparticles surface, preferably the stabilizing agent does not contain groups exhibiting affinity for SERS-enhancing materials, in particular gold. Examples of such groups are nitrogen-containing groups, sulfur-containing groups, ethynyl groups, cyano groups and isocyanide groups.

As used herein, the term "carboxylic acid" refers to an organic compound containing a carboxyl group (C(=O)OH) and encompasses monocarboxylic acids (i.e. organic compounds containing a single carboxyl group), such as lactic acid, and polycarboxylic acids (i.e. organic compounds containing two or more carboxyl group), such as citric acid.

As used herein, the term "carboxylic acid salt" refers to a sodium or potassium salt of a carboxylic acid.

Preferably, the stabilizing agent is selected from carboxylic acids, carboxylic acid salts, ascorbic acid, ascorbic acid salts, and mixtures thereof. Even more preferably, the stabilizing agent is selected from citric acid, citric acid salts, lactic acid, lactic acid salts, ascorbic acid, ascorbic acid salts, and mixtures thereof. Citric acid salts include monosodium dihydrogen citrate, disodium hydrogen citrate, trisodium citrate, monopotassium dihydrogen citrate, dipotassium hydrogen citrate and tripotassium citrate. Lactic acid salts include sodium lactate and potassium lactate. Ascorbic acid salts include sodium ascorbate and potassium ascorbate. In the most preferred embodiment, the stabilizing agent is selected from citric acid, monosodium dihydrogen citrate, disodium hydrogen citrate, trisodium citrate, monopotassium dihydrogen citrate, dipotassium hydrogen citrate and tripotassium citrate, and mixtures thereof.

Advantageously, the manufacturing method claimed and described herein enables the integration of any Raman active reporter molecule in a SERS tag. Preferred Raman active reporter molecules include fully conjugated molecules comprising an aryl group substituted by one or more substituents selected from $NR^1R^2$, —SH, —≡, —≡N and —N≡, preferably from —$NR^1R^2$ and —SH, and/or an N-containing heteroaryl group and/or a S-containing heteroaryl group, wherein the residues $R^1$ and $R^2$ are independently of each other selected from —H and alkyl, preferably from —H and $C_1$-$C_4$-alkyl.

As known to the person skilled in the art of organic chemistry, a fully conjugated molecule is a molecule having a conjugated electrons system extending over the entire molecule. A conjugated electrons system is a system of connected p orbitals with delocalized electrons.

As well known to the skilled person "an aryl group" is a group derived from a monocyclic or polycyclic aromatic hydrocarbon compound by removal of one hydrogen atom from a ring carbon atom. Examples of aryl groups include without limitation phenyl, naphthyl, anthracenyl, phenanthryl and pyrenyl.

A S-containing heteroaromatic compound is an aromatic compound containing a sulfur heteroatom as part of the cyclic conjugated π system. As part of the cyclic conjugated π system, the S-containing heteroaromatic compound may further contain one or more nitrogen atoms. Examples of S-containing heteroaryl groups include without limitation thiophenyl, thiazolyl, isothiazolyl, thiadiazolyl, benzothiophenyl, benzothiazolyl, benzoisothiazolyl, benzothiadiazolyl, imidazothiazolyl and imidazothiadiazolyl.

An N-containing heteroaromatic compound is an aromatic compound containing at least one nitrogen heteroatom as part of the cyclic conjugated π system. As part of the cyclic conjugated π system, the N-containing heteroaromatic compound may further contain one or more oxygen atoms. Examples of N-containing heteroaryl groups include without limitation imidazolyl, pyrazolyl, triazolyl, tetrazolyl, benzaimidazolyl, indazolyl, benzotriazolyl, pyridinyl, pyrimidinyl, pyridazinyl, triazinyl, quinolinyl, isoquinolinyl, diazanaphthyl, quinalozinyl, cinnolinyl, phthalazinyl, quinoxalinyl, purinyl, aza-phenanthryl, diaza-phenanthryl, aza-anthracenyl, diaza-anthracenyl, aza-pyrenyl, diazapyrenyl, oxazolyl, isoxazolyl, oxadiazolyl, benzoxazolyl, benzisoxazolyl and benzoxadiazolyl.

Preferred Raman active reporter molecules include, but are not restricted to:

a fully conjugated compound consisting of an aryl group substituted by one or more substituents selected from —$NR^1R^2$, —SH, —≡, —≡N and —N≡, preferably from —$NR^1R^2$ and —SH, which is connected directly or via a linker -$L^1$- to an aryl group substituted by one or more substituents selected from the list comprising an amino group (—$NH_2$), an N-alkyl amino group, an N,N-dialkyl-amino group, a thiol group, an ethynyl group, a cyano group and an isocyanide group, a N-containing heteroaryl group, or a S-containing heteroaryl group, wherein the substituents $R^1$ and $R^2$ have the meanings defined herein;

the linker -$L^1$- is selected from —$CR^8$=$CR^9$—, —N=N—, —≡—, —$CR^{10}$=$CR^{11}$-o-$C_6H_4$—, —$CR^{10}$=$CR^{11}$-m-$C_6H_4$—, —$CR^{10}$=$CR^{11}$-p-$C_6H_4$—, —$CR^{10}$=$CR^{11}$-p-$C_6H_4$—$CR^{12}$=$CR^{13}$—, —$CR^{14}$=N—N=$CR^{15}$—,

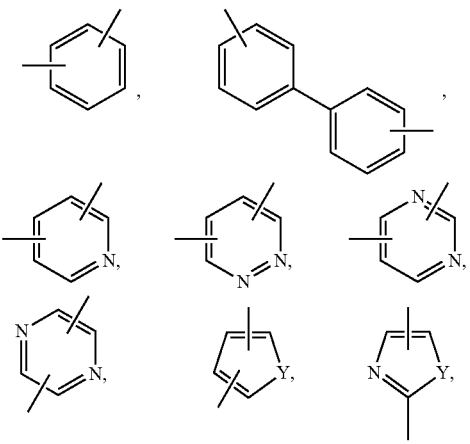

-continued

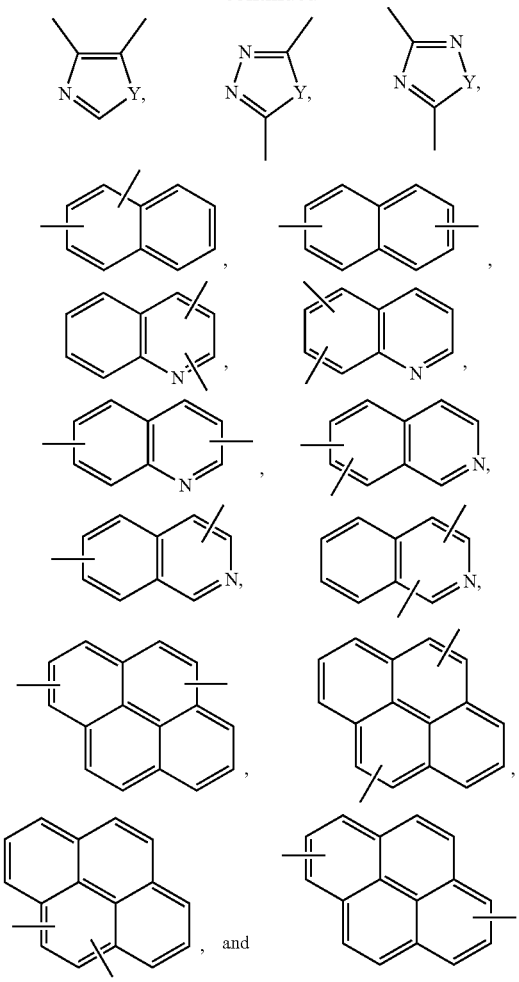

and the substituents $R^8$-$R^{15}$ are selected from hydrogen, alkyl, alkoxy, alkylthio, formyl, cyano, nitro, halide, hydroxycarbonyl, and alkoxycarbonyl;

a fully conjugated compound consisting of an N-containing heteroaryl group, which is connected directly or via a linker -$L^1$- to an N-containing heteroaryl group, or a S-containing heteroaryl group, wherein the linker -$L^1$- is selected from —$CR^8$=$CR^9$—, —N=N—, —≡—, —$CR^{10}$=$CR^{11}$-o-$C_6H_4$—, —$CR^{10}$=$CR^{11}$-m-$C_6H_4$—, —$CR^{10}$=$CR^{11}$-p-$C_6H_4$—, —$CR^{10}$=$CR^{11}$-o-$C_6H_4$—$CR^{12}$=$CR^{13}$—, —$CR^{10}$=$CR^{11}$-m-$C_6H_4$—$CR^{12}$=$CR^{13}$—, —$CR^{10}$=$CR^{11}$-p-$C_6H_4$—$CR^{12}$=$CR^{13}$—, —$CR^{14}$=N—N=$CR^{15}$—,

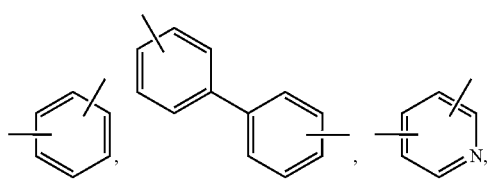

-continued

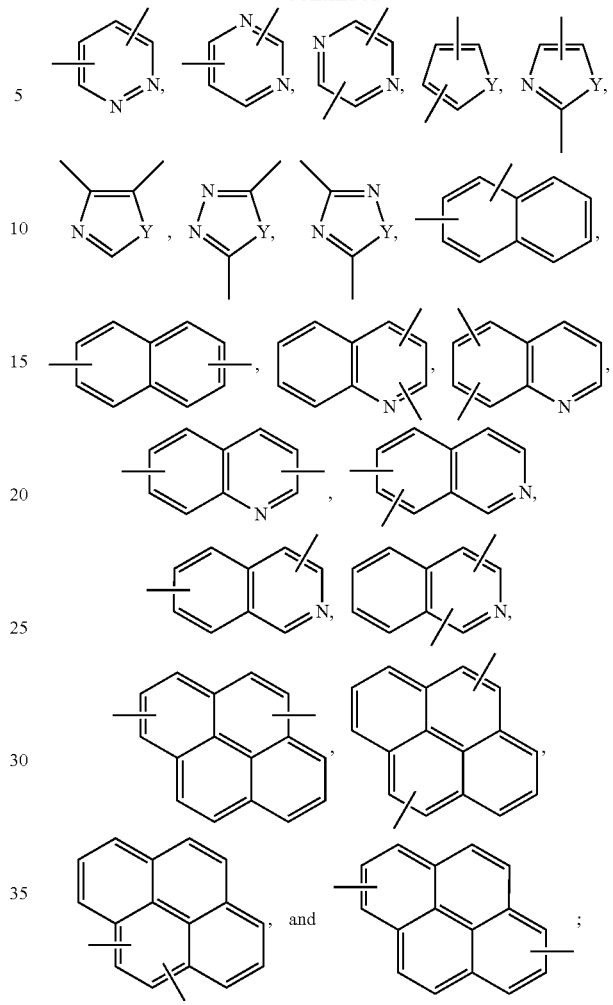

and the substituents $R^8$-$R^{15}$ are selected from hydrogen, alkyl, alkoxy, alkylthio, formyl, cyano, nitro, halide, hydroxycarbonyl and alkoxycarbonyl;

a fully conjugated compound consisting of a S-containing heteroaryl group, which is connected directly or via a linker -$L^1$- to an S-containing heteroaryl group, wherein the linker -$L^1$- is selected from —$CR^8$=$CR^9$—, —N=N—, —≡—, —$CR^{10}$=$CR^{11}$-o-$C_6H_4$—, —$CR^{10}$=$CR^{11}$-m-$C_6H_4$—, —$CR^{10}$=$CR^{11}$-p-$C_6H_4$—, —$CR^{10}$=$CR^{11}$-o-$C_6H_4$—$CR^{12}$=$CR^{13}$—, —$CR^{10}$=$CR^{11}$-m-$C_6H_4$—$CR^{12}$=$CR^{13}$—, —$CR^{10}$=$CR^{11}$-p-$C_6H_4$—$CR^{12}$=$CR^{13}$—, —$CR^{14}$=N—N=$CR^{15}$—,

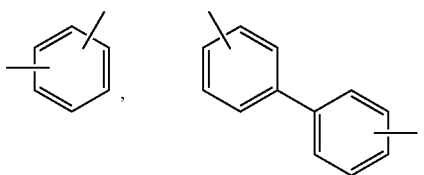

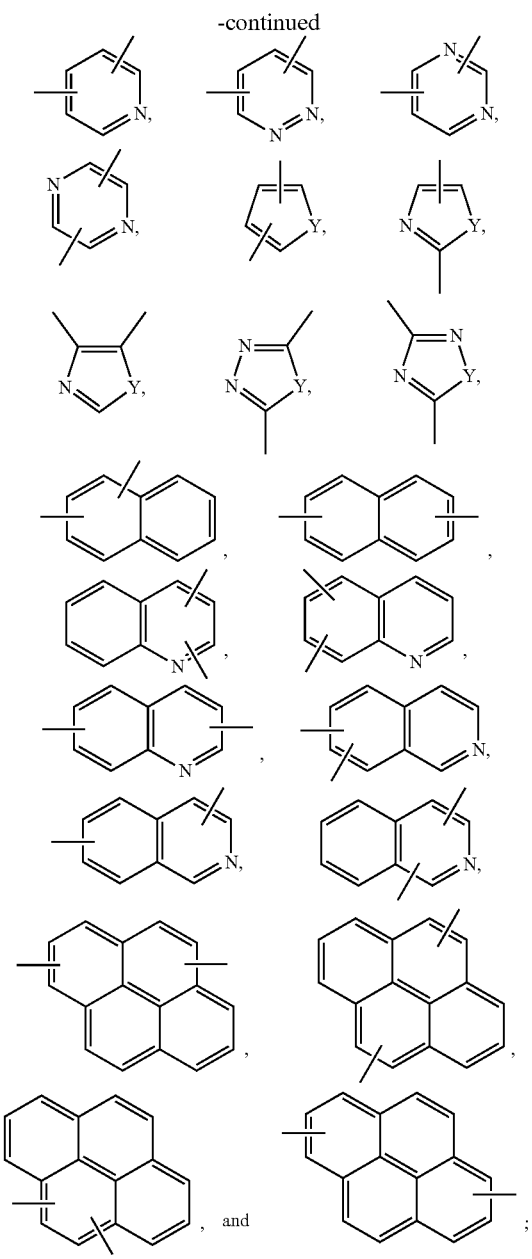

and the substituents R⁸-R¹⁵ are selected from hydrogen, alkyl, alkoxy, alkylthio, formyl, cyano, nitro, halide, hydroxycarbonyl and alkoxycarbonyl;
and
a fully conjugated compound consisting of an aryl group substituted by one or more, preferably at least two, substituents selected from —NR¹R², —SH, —≡, —≡N and —N≡, preferably from —NR¹R² and —SH, an N-containing heteroaryl group optionally substituted by one or more substituents selected from —NR³R⁴, —SH, —≡, —≡N and —N≡, or a S-containing heteroaryl group optionally substituted by one or more substituents selected from —NR⁵R⁶, —SH, —≡, —≡N and —N≡, connected directly to a hydrogen atom, wherein the substituents R¹ and R² have the meanings defined herein and the substituents R³-R⁶ are independently of each other selected from —H and alkyl, preferably from —H and $C_1$-$C_4$-alkyl.

The aryl group substituted by one or more substituents selected from —NR¹R², —SH, —≡, —≡N and —N≡, and preferably from —NR¹R² and —SH, may contain one or more further substituents preferably selected from: hydroxy, alkyl, alkoxy, alkylthio, formyl, nitro, halide, hydroxycarbonyl, alkoxycarbonyl and O-containing heteroaryl group, and more preferably selected from: alkyl, alkoxy, alkylthio, halides and O-containing heteroaryl group.

The N-containing heteroaryl group and the S-containing heteroaryl group may contain one or more further substituents preferably selected from: amino, N-alkyl amino, N,N-dialkyl-amino, thiol, hydroxy, alkyl, alkoxy, alkylthio, formyl, cyano, isocyanide, ethynyl, nitro, halide, hydroxycarbonyl, alkoxycarbonyl and O-containing heteroaryl group, preferably from alkyl, alkoxy, alkylthio, halides and O-containing heteroaryl group.

Examples of O-containing heteroaryl groups include, but are not restricted to furanyl, benzofuranyl, isobenzofuranyl, oxazolyl, isoxazolyl, benzoxazolyl and oxadiazolyl.

A preferred Raman active reporter compound is a compound of general formula (I).

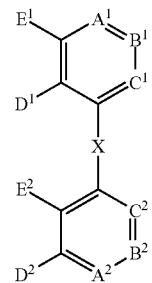

wherein
A¹, B¹ and C¹ are independently of each other selected from N, CR¹⁶ and CR¹⁷, with the proviso that only one of A¹, B¹ and C¹ is N;
A², B² and C² are independently of each other selected from N, CR¹⁸ and CR¹⁹, with the proviso that only one of A², B² and C² is N;
E¹, D¹, E², D², R¹⁶, R¹⁷, R¹⁸ and R¹⁹ are independently of each other selected from: hydrogen, amino, N-alkyl amino, N,N-dialkyl-amino, thiol, hydroxy, alkyl, alkoxy, alkylthio, formyl, cyano, isocyanide, alkynyl, nitro, halide, hydroxycarbonyl, alkoxydarbonyl and O-containing heteroaryl group, preferably from hydrogen, alkyl, alkoxy, alkylthio, halides and O-containing heteroaryl group; and
X is a single bond or a linker -L²- selected from —CR⁸=CR⁹—, —N=N—, —≡—, —CR¹⁰=CR¹¹-o-C₆H₄—, —CR¹⁰=CR¹¹-m-C₆H₄—, —CR¹⁰=CR¹¹-p-C₆H₄—, —CR¹⁰=CR¹¹-o-C₆H₄—CR¹²=CR¹³—, —CR¹⁰=CR¹¹-m-C₆H₄—CR¹²=CR¹³—, —CR¹⁰=CR¹¹-p-C₆H₄—CR¹²=CR¹³—, —CR¹⁴=N—N=CR¹⁵—,

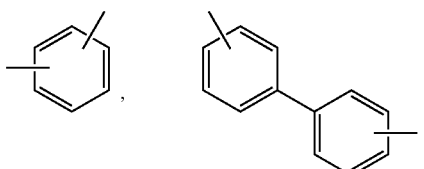

-continued

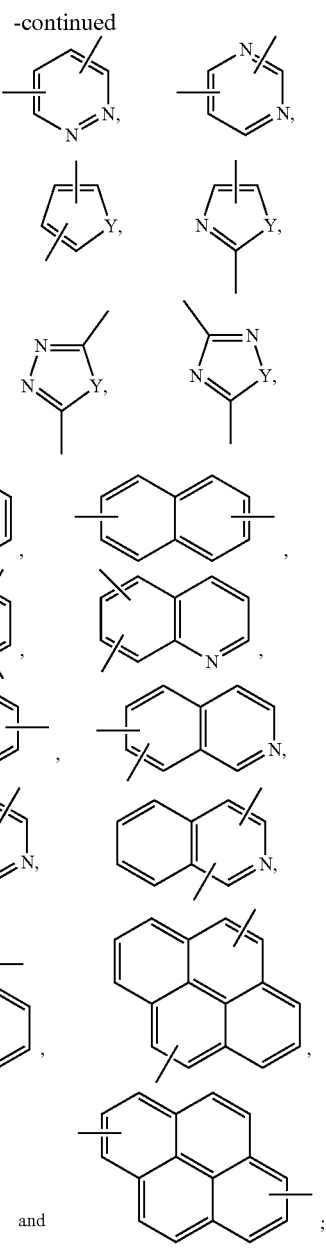

wherein $R^8$-$R^{15}$ are selected from hydrogen, alkyl, alkoxy, alkylthio, formyl, cyano, nitro, halide, hydroxycarbonyl, and alkoxycarbonyl.

Preferably, the residues $A^1$ and $A^2$ are N in the general formula (I). More preferably, the residues $A^1$ and $A^2$ are N and the substituents $E^1$, $D^1$, $E^2$, $D^2$, $R^{16}$, $R^{17}$, $R^{18}$ and $R^{19}$ are hydrogen in general formula (I).

Raman active reporter molecules include without limitation: 2-mercaptopyridine, benzenethiol; mercaptobenzoic acid; 4-nitrobenzenethiol; 3,4-dicholorobenzenethiol; 3-fluorothiophenol; 4-fluorothiophenol; 3-5-bis(trifluoromethyl)benzenethiol; 4-mercaptophenol; biphenyl-4-thiol, 7-mercapto-4-methylcoumarin, 1-(4-hydroxyphenyl)-1H-tetrazole-5-thiol, 2-fluorothiophenol, 2-naphthalenethiol, 4-(((3-mercapto-5-(2-methoxyphenyl)-4H-1,2,4-triazol-4-yl)imino)methyl)phenol, (2-trifluoromethyl) benzenethiol, 4-aminothiophenol, 1-naphthalenethiol, 1,1',4,1''-terphenyl-4-thiol, biphenyl-4,4'-dithiol, thiosalicylic acid, 4-(((3-mercapto-5-(2-pyridinyl)-4H-1,2,4-triazol-4-yl)imino)methyl)-1,2-benzenediol, 4-(((3-mercapto-5-(2-pyridinyl)-4H-1,2,4-triazol-4-yl)imino)methyl)benzoic, 2,3,4,6-tetrafluorobenzenethiol, (5-(4-methoxyphenyl)-1,3,4-oxidazole-2-thiol), (E)-1,2-di(pyridin-4-yl)ethene, 5-(pyridin-4-yl)-1,3,4-oxadiazole-2-thiol, and 1,4-bis((E)-2-(pyridin-4-yl)vinyl)benzene.

The first colloid provided at step a) is characterized by a ζ-potential value lower than or equal to −25 mV. The second colloid provided at step b) is characterized by a ζ-potential value lower than or equal to −25 mV.

As used herein, the ζ-potential value of a colloid refers to the ζ-potential value measured for said colloid at a concentration of 0.05 mg nanoparticle material/mL with a Malvern Zetasizer Nano-ZS with 1 mL folded capillary cells. If required, namely for colloids having a concentration higher than 0.05 mg nanoparticle material/mL, the colloid is diluted with deionized water to achieve the concentration of 0.05 mg nanoparticle material/mL prior to the ζ-potential measurement.

Preferably, the concentration of the nanoparticle material (mg/mL) in the first colloid and in the second colloid is lower than 0.66 mg/mL, and more preferably is comprised in between about 0.05 mg/mL and about 0.30 mg/mL, for e.g. 0.05 mg/mL, 0.10 mg/mL, 0.15 mg/mL, 0.20 mg/mL, 0.25 mg/mL and 0.30 mg/mL.

Following combination of the first colloid with the second colloid, for example by simple addition of the second colloid to the first colloid, so that the ratio between the number of nanoparticles of the first colloid and the number of nanoparticles of the second colloid is of between about 25:1 to about 1:1, preferably from about 5:1 to about 1:1, more preferably from about 4:1 to about 3:1, nanoparticles aggregation is induced. The aggregation described herein consists of selective aggregation of the nanoparticles of the second colloid with the nanoparticles of the first colloid i.e. there is no aggregation of the nanoparticles of the first colloid with the nanoparticles of the first colloid, and there is no or negligible aggregation of the nanoparticles of the second colloid with the nanoparticles of the second colloid.

The nanoparticles aggregation is induced by any of the steps d1)-d3) or a combination thereof:
d1) mixing the third colloid obtained at step c) at a pH comprised between about 2.2 and the lowest pH value at which the Raman active reporter molecules have a net electrical charge of between 0 and 0.3;
d2) addition of a salt solution, preferably an inorganic salt solution, to the third colloid obtained at step c);
d3) addition of a water-miscible solvent to the third colloid obtained at step c).

In a preferred embodiment inducing aggregation of nanoparticles comprises step d1), namely mixing the third colloid obtained at step c) at a pH comprised between about 2.2 and the lowest pH value at which the Raman active reporter molecules have a net electrical charge of between 0 and 0.3. The net electrical charge of a Raman active reporter molecule and the pH value corresponding to said net electrical charge can be predicted through online tools such as Chemicalize.com (Chemicalize. ChemAxon. http://chemicalize.com/#/calculation). At a pH comprised between about 2.2 and the lowest pH value at which the Raman active reporter molecules have a net electrical charge of between 0 and 0.3, selective aggregation of the nanoparticles of the first colloid with the nanoparticles of the second colloid occurs.

Alternatively, inducing aggregation of nanoparticles comprises step d2), namely addition of a salt solution, preferably an inorganic salt solution, to the third colloid obtained at step c). Salt-induced aggregation of nanoparticles is a well-known method of inducing nanoparticles aggregation for the person skilled in the art of colloid chemistry (*ChemPhysChem* 2018, 19, 24-28). Examples of inorganic salts to be used at step d2) of the manufacturing method as a solution, such as an aqueous solution, include but are not restricted to: sodium fluoride, sodium chloride, sodium bromide, sodium iodide, magnesium chloride, potassium chloride and mixtures thereof.

In a further alternative embodiment, inducing aggregation of nanoparticles comprises step d3), namely addition of a water-miscible solvent to the third colloid obtained at step c). The water-miscible solvent is preferably selected from the list comprising: methanol, ethanol, propanol, isopropanol, tetrahydrofuran, N-methyl-2-pyrrolidone (NMP), dimethyl sulfoxide (DMSO), N,N-dimethylformamide (DMF), acetone and acetonitrile.

A preferred manufacturing method according to the present invention comprises the steps of:
a) providing a first colloid consisting essentially of nanoparticles having a plasmonic surface and substantially same size dispersed in an aqueous solvent, and a stabilizing agent adsorbed on the surface of said nanoparticles, and having a $\zeta$-potential value lower than or equal to −25 mV;
b) providing a second colloid consisting essentially of nanoparticles having a plasmonic surface and substantially same size dispersed in an aqueous solvent, a Raman active reporter molecule of general formula (I) adsorbed on the surface of said nanoparticles, and a stabilizing agent adsorbed on the surface of said nanoparticles, and having a $\zeta$-potential value lower than or equal to −25 mV;
c) combining the first colloid with the second colloid so that the ratio between the number of nanoparticles of the first colloid and the number of nanoparticles of the second colloid is of between about 25:1 to about 1:1, preferably from about 5:1 to about 1:1, more preferably from about 4:1 to about 3:1 to provide a third colloid;
d) inducing aggregation of the nanoparticles by any of the steps d1)-d3) or a combination thereof:
   d1) mixing the third colloid obtained at step c) at a pH comprised between about 2.2 and about 6.1, preferably between about 2.6 and about 5.7;
   d2) addition of a salt solution, preferably an inorganic salt solution, to the third colloid obtained at step c);
   d3) addition of a water-miscible solvent to the third colloid obtained at step c); and
e) stopping aggregation.

Preferably in the manufacturing methods described herein, step b) comprises the following steps conducted in the order b1) to b3):
b1) providing a colloid comprising nanoparticles having a plasmonic surface and substantially same size dispersed in an aqueous solvent, and a stabilizing agent adsorbed on the surface of said nanoparticles, and having a $\zeta$-potential value lower than or equal to −25 mV,
b2) adjusting the pH of the colloid at a value higher than the lowest pH value at which the Raman active reporter molecules to be adsorbed on the surface of the nanoparticles carry no net electrical charge while maintaining the $\zeta$-potential value lower than or equal to −25 mV, preferably lower than −40 mV; and
b3) adding a solution of the Raman active molecules in a solvent to the colloid obtained at step b2) while maintaining the $\zeta$-potential value lower than or equal to −25 mV.

The colloid provided at step b1) of the manufacturing method claimed herein consists essentially of nanoparticles having a plasmonic surface and substantially same size dispersed in an aqueous solvent, and a stabilizing agent adsorbed on the surface of said nanoparticles. The first colloid provided at step a) of the manufacturing method claimed herein consists essentially of nanoparticles having a plasmonic surface and substantially same size dispersed in an aqueous solvent, and a stabilizing agent adsorbed on the surface of said nanoparticles. The second colloid provided at step b) of the manufacturing method claimed herein consists essentially of nanoparticles having a plasmonic surface and substantially same size dispersed in an aqueous solvent, Raman active reporter molecules adsorbed on the surface of said nanoparticles, and a stabilizing agent adsorbed on the surface of said nanoparticles. Thus, the nanoparticles of the first colloid and the nanoparticles of the second colloid do not present on their surface molecules or organisms enabling the specific interaction via a lock-and-key mechanism between the nanoparticles of the first colloid and the nanoparticles of the second colloid. Examples of such molecules include antibodies, proteins, antigens, complementary DNA strands and complementary RNA strands. Examples of such organisms include bacteria, viruses and spores. Thus, the first colloid, the second colloid, as well as the colloid provided at step b1) besides being surfactant- and polymer-free, are also free of molecules such as antibodies, proteins, antigens, complementary DNA strands and complementary RNA strands, and organisms, such as bacteria, viruses and spores.

At step b2) of the manufacturing method according to the present invention, the pH of the colloid is adjusted at a value higher than lowest pH value at which the Raman active reporter molecules to be adsorbed on the surface of the nanoparticles carry no net electrical charge, while maintaining the $\zeta$-potential value lower than or equal to −25 mV, preferably lower than −40 mV. The net electrical charge of a Raman active reporter molecule and the pH value corresponding to said net electrical charge can be predicted through online tools such as Chemicalize.com (Chemicalize. ChemAxon. http://chemicalize.com/#/calculation).

Preferably, at step b2), the pH of the colloid is adjusted in between about 8.2 and about 12.1, while maintaining the $\zeta$-potential value lower than or equal to −25 mV, preferably lower than −40 mV. In a more preferred embodiment, the pH of the colloid is adjusted at step b2) at a value of about 11.0.

At step b3) according to the present invention, a solution of Raman active reporter molecule in a solvent is added to the colloid obtained at step b2) while maintaining the $\zeta$-potential value lower than or equal to −25 mV. The solvent used for preparing the solution of Raman active reporter molecule encompasses any aqueous solvent and any organic solvent suitable for dissolving the Raman active reporter molecule. Examples of organic solvents include, but are not limited to alcohols, preferably selected from methanol, ethanol, propanol and isopropanol, tetrahydrofuran, N-methyl-2-pyrrolidone (NMP), dimethyl sulfoxide (DMSO), N,N-dimethylformamide (DMF), acetone and acetonitrile. Aqueous solvents include, but are not limited to water and mixtures of water and water-miscible solvents, such as methanol, ethanol, propanol, isopropanol, tetrahydrofuran, N-methyl-2-pyrrolidone (NMP), dimethyl sulfoxide (DMSO), N,N-dimethylformamide (DMF), acetone and acetonitrile.

A preferred manufacturing method according to the present invention comprises the steps of:
 a) providing a first colloid consisting essentially of nanoparticles having a plasmonic surface and substantially same size dispersed in an aqueous solvent, and a stabilizing agent adsorbed on the surface of said nanoparticles, and having a ζ-potential value lower than or equal to −25 mV;
 b) providing a second colloid consisting essentially of nanoparticles having a plasmonic surface and substantially same size dispersed in an aqueous solvent, a Raman active reporter molecule of general formula (I) adsorbed on the surface of said nanoparticles, and a stabilizing agent adsorbed on the surface of said nanoparticles, and having a ζ-potential value lower than or equal to −25 mV;
 c) combining the first colloid with the second colloid so that the ratio between the number of nanoparticles of the first colloid and the number of nanoparticles of the second colloid is of between about 25:1 to about 1:1, preferably from about 5:1 to about 1:1, more preferably from 4:1 to about 3:1 to provide a third colloid;
 d) inducing aggregation of the nanoparticles by any of the steps d1)-d3) or a combination thereof:
  d1) mixing the third colloid obtained at step c) at a pH comprised between about 2.2 and about 6.1, preferably between about 2.6 and about 5.7;
  d2) addition of a salt solution, preferably an inorganic salt solution, to the third colloid obtained at step c);
  d3) addition of a water-miscible solvent to the third colloid obtained at step c); and
 e) stopping aggregation,
wherein step b) comprises the following steps conducted in the order b1) to b3):
 b1) providing a colloid consisting essentially of nanoparticles having a plasmonic surface and substantially same size dispersed in an aqueous solvent, and a stabilizing agent adsorbed on the surface of said nanoparticles, and having a ζ-potential value lower than or equal to −25 mV;
 b2) adjusting the pH of the colloid at a value comprised between about 8.0 and about 12.1, preferably between about 8.2 and 12.1, while maintaining the ζ-potential value lower than or equal to −25 mV, preferably lower than −40 mV; and
 b3) adding a solution of a Raman active reporter molecule of general formula (I) in a solvent to the colloid obtained at step b2) while maintaining the ζ-potential value lower than or equal to −25 mV.

The inventors found that the intensity of the signal of the SERS tags manufactured according to the present invention can be further increased by ensuring that a sub-monolayer or a monolayer of Raman active reporter molecules is adsorbed on the surface of the nanoparticles contained by the second colloid. Thus, a further preferred embodiment according to the present invention is directed to a manufacturing method of SERS tags as claimed herein, wherein the nanoparticles of the second colloid have absorbed on their surface a sub-monolayer or monolayer of Raman active reporter molecules. As used herein, a monolayer of Raman-active reporter molecules adsorbed on the surface of the nanoparticles of the second colloid refers to a one Raman active reporter molecule-thick layer adsorbed on the surface of said nanoparticles. As used herein, a sub-monolayer of Raman active reporter molecules refers to an incomplete monolayer of Raman-active reporter molecules. To ensure that a sub-monolayer or monolayer of Raman-active reporter molecules is adsorbed on the surface of the nanoparticles of the second colloid, the amount of the Raman active reporter molecules added at step b3) to the colloid obtained at step b2) has to be calculated by methods well known to the skilled person depending on the shape and size of the of the nanoparticles of the second colloid.

The manufacturing method claimed herein enables also the preparation of SERS tags comprising a mixture of different Raman active reporter molecules i.e. a mixture of two or more different Raman active reporter molecules. This is particularly advantageous because it enables the access to a variety of SERS tags, wherein each of said SERS tags is characterized by a unique SERS signal, by combining a limited number of different Raman active reporter molecules in different ratios. To achieve such SERS tags, the nanoparticles of the second colloid provided at step b) are prepared so that to have absorbed on their surface a mixture of different Raman active reporter molecules (i.e. a mixture of two or more different Raman active reporter molecules). Such second colloid can be prepared by using at step b3) of the manufacturing method a solution of Raman active molecules in a solvent comprising two or more different Raman active reporter molecules or by conducting successively step b3) of the manufacturing method and using each time a different solution containing a different Raman active reporter molecule. Thus, a further embodiment according to the present invention is directed to a manufacturing method, wherein at step b3) the solution of the Raman active reporter molecules in a solvent comprises a mixture of two or more different Raman active reporter molecules. Other further embodiment according to the present invention is directed to a manufacturing method, wherein step b3) is conducted successively n times with n≥2, using each time a solution containing a Raman active reporter molecule, which is structurally different from the Raman active reporter molecules used in the remaining n−1 solutions used in the remaining n−1 steps. As used herein, different Raman active reporter molecules refer to Raman active reporter molecules having a different chemical structure and providing a different SERS spectrum.

To further increase the low-number aggregates population, and thereby the intensity of the SERS signal provided by the SERS tags manufactured by the manufacturing method claimed herein, it is preferred that at step c) the ratio between the number of nanoparticles of the first colloid and the number of nanoparticles of the second colloid is of between about 5:1 to about 1:1, preferably from about 4:1 to about 3:1. As attested for instance by example 10 and FIG. 3b, a ratio between the number nanoparticles of the first colloid and the number of nanoparticles of the second colloid of between about 5:1 and about 1:1 allows the access to SERS tags with high population of low-number aggregates, such as dimers, trimers and tetramers.

To induce aggregation by the method described at step d1) it is required to mix the third colloid obtained at step c) at a pH comprised between about 2.2 and the lowest pH value at which the Raman active reporter molecules have a net electrical charge of between 0 and 0.3, which for a Raman active reporter molecule of general formula (I) is a pH comprised between about 2.2 and about 6.1, preferably between about 2.6 and about 5.7. This can be achieved either by addition of an acid solution to the third colloid obtained at step c), or by adjusting the pH of the first colloid so that the colloid obtained at step d1) has the required pH value.

Hence, an embodiment according to the present invention is directed to a manufacturing method wherein step d1) further comprises addition of an acid solution to the third colloid obtained at step c) while mixing so that the pH of the resulting colloid is comprised between about 2.2 and the lowest pH value at which the Raman active reporter molecules have a net electrical charge of between 0 and 0.3, which in the case of a Raman active reporter molecule of general formula (I) is a pH comprised between about 2.2 and about 6.1, preferably between about 2.6 and about 5.7. Suitable acid solutions include, but are not limited to acetic acid, hydrochloric acid, and nitric acid.

To avoid an additional manufacturing step, it is convenient to adjust the pH value of the first colloid so that the colloid obtained at step d1) has a pH comprised between about 2.2 and the lowest pH value at which the Raman active reporter molecules have a net electrical charge of between 0 and 0.3, which in the case of a Raman active reporter molecule of general formula (I) is a pH comprised between about 2.2 and about 6.1, preferably between about 2.6 and about 5.7.

The manufacturing method claimed herein includes also step e) stopping aggregation. Preferably, step e) comprises any of the followings steps e1)-e4):
  e1) adjusting the pH of the colloid obtained at step d) at a value higher than the lowest pH value at which the Raman active reporter molecules to be adsorbed on the surface of the nanoparticles carry no net electrical charge;
  e2) diluting the colloid obtained at step d) with water, preferably so that the nanoparticles concentration in the colloid is below $6*10^9$ nanoparticles/mL;
  e3) addition of a polymer to the colloid obtained at step d);
  e4) addition of a dielectric material precursor to the colloid obtained at step d).

In the inventive manufacturing method claimed herein, aggregation can be stopped by any of the methods e1)-e4).

Adjustment of the pH of the colloid obtained at step d) at a value higher than the lowest pH value at which the Raman active reporter molecules to be adsorbed on the surface of the nanoparticles carry no net electrical charge as described by step e1), results in an increase of the electrostatic repulsions between the nanoparticles aggregates, leading to the stopping of the aggregation process. The net electrical charge of a Raman active reporter molecule and the pH value corresponding to said net electrical charge can be predicted through online tools such as Chemicalize.com (Chemicalize. ChemAxon. http://chemicalize.com/#/calculation).

Addition of a polymer to the colloid obtained at step d) as described at step e3) results in the increase of steric repulsions between the nanoparticles aggregates and leads to the stopping of the aggregation process. Advantageously, the polymer used at step e3) does not influence the SERS signal exhibited by the SERS tag. Suitable polymers include but are not limited to polyvinylpyrrolidone and polyethylene glycol.

Addition of a dielectric material precursor to the colloid obtained at step d) as described at step e4) results in the encapsulation of the nanoparticles aggregates with at least one layer of dielectric material, which stabilizes the SERS tags and implicitly results in the stopping of the aggregation process. Preferably, the dielectric material precursor is a silica precursor. Silica precursors include, but are not restricted to solutions of tetraethyl orthosilicate and 3-aminopropyltrimethoxysilane in ethanol, solutions of tetraethyl orthosilicate and (3-mercaptopropyl)trimethoxysilane in ethanol, solutions of sodium silicate in water, and solutions of (3-mercaptopropyl)trimethoxysilane in water.

Alternatively, the aggregation process can be stopped by diluting the colloid obtained at step d) with water. Preferably, the aggregation is stopped by diluting the colloid obtained at step d) with water so that to reach a concentration of nanoparticle material [µg/mL] lower than or equal to 12.5 µg/mL (see for e.g.: E1-E8, E11-E14). Alternatively, the aggregation is stopped by diluting the colloid obtained at step d) with water so that to reach a nanoparticles concentration below $6*10^9$ nanoparticles/mL.

A further preferred embodiment of the present invention is directed to a manufacturing method of SERS tags, wherein step e) consists essentially of step e3) and the manufacturing method further comprises dilution of the colloid obtained at step e3) with water and/or coating of the SERS tags with a dielectric material.

Figure 1B:
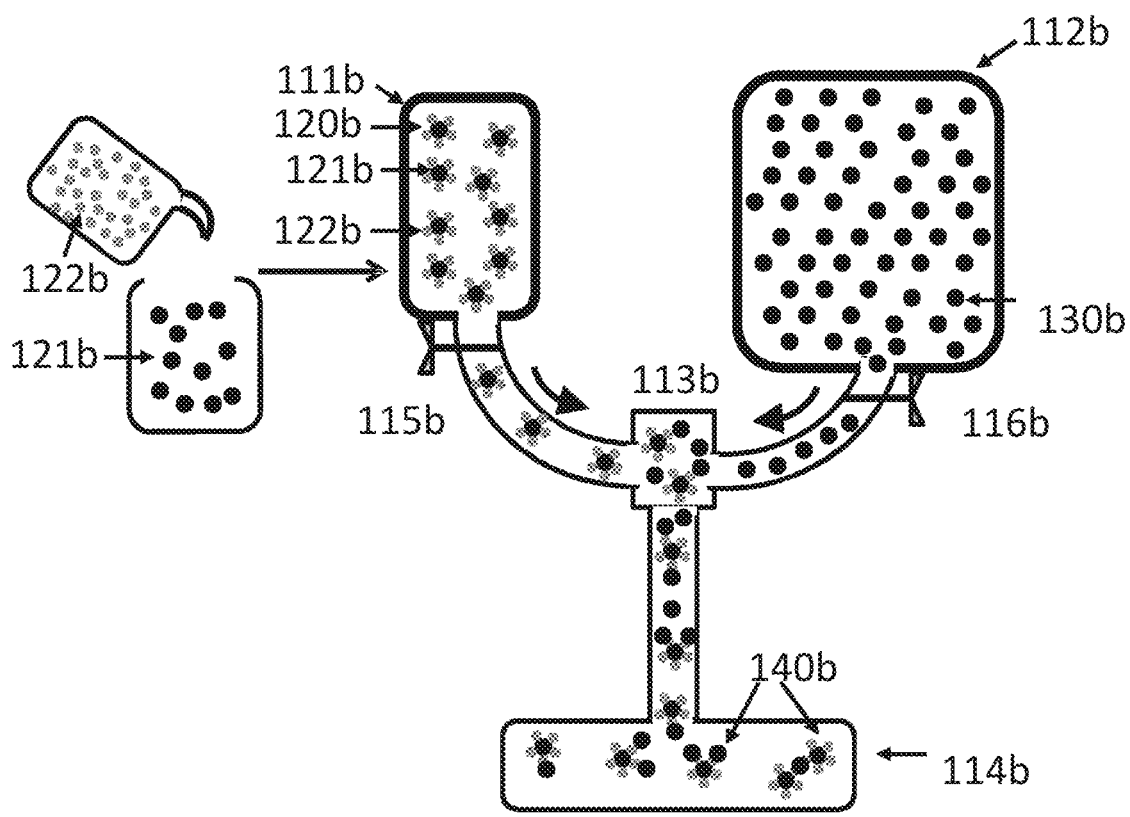
FIG. 1b schematically represents an embodiment of the manufacturing method of SERS tags according to the present invention. In this specific manufacturing method, a continuous flow reactor comprising two pressurized tanks (111b, 112b), a tee fitting (113b) and a collecting reservoir (114b), wherein each of the two pressurized tanks (111b, 112b) is connected via a tubing to the tee fitting (113b), which itself is connected via a tubing to the collecting reservoir (114b). The manufacturing method includes combining and mixing simultaneously at a pH comprised between about 2.2 and the lowest pH value at which the Raman active reporter molecules have a net electrical charge of between 0 and 0.3 in the tubing connecting the tee fitting (113b) to the collecting reservoir (114b) of the continuous flow reactor a first colloid provided by the pressurized tank (112b) and consisting essentially of nanoparticles with a plasmonic surface and substantially same size (130b) dispersed in an aqueous solvent (not shown), wherein said nanoparticles have adsorbed on their surface a stabilizing agent (not shown), with a second colloid (120b) provided by the pressurized tank (111b) and consisting essentially of nanoparticles with a plasmonic surface and substantially same size (121b) dispersed in an aqueous solvent (not shown), wherein said nanoparticles have adsorbed on their surface Raman active reporter molecules (122b) and a stabilizing agent (not shown). The mixing at a pH comprised between about 2.2 and the lowest pH value at which the Raman active reporter molecules have a net electrical charge of between 0 and 0.3 induces nanoparticles aggregation. The aggregation step is stopped in the collecting reservoir (114b), thereby providing the target SERS tags (140b).
Figure 1C:
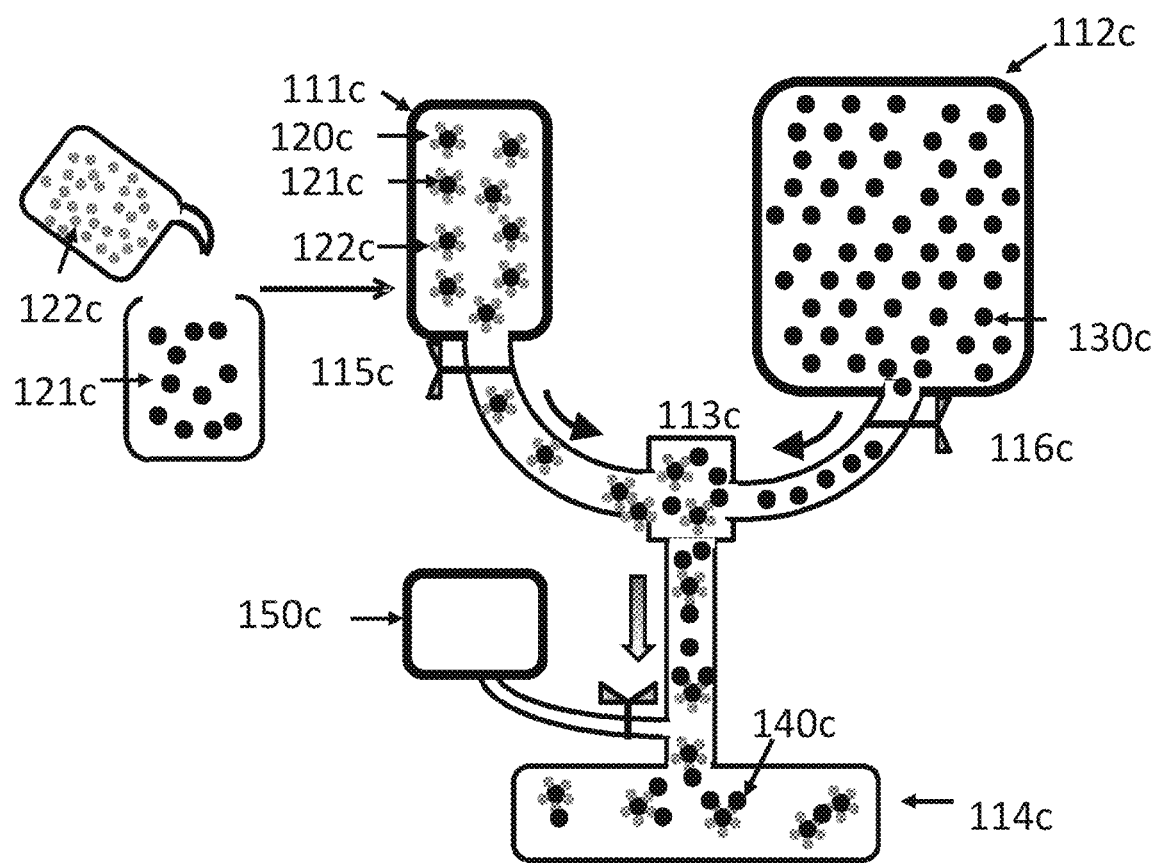
FIG. 1c schematically represents an embodiment of the manufacturing method of SERS tags according to the present invention. In this specific manufacturing method, a continuous flow reactor comprises three pressurized tanks (111c, 112c, 150c), a tee fitting (113c) and a collecting reservoir (114c). Each of the two pressurized tanks (111c, 112c) is connected via a tubing to the tee fitting (113c), which itself is connected via a tubing to the collecting reservoir (114c). The manufacturing method includes combining and mixing simultaneously at a pH comprised between about 2.2 and the lowest pH value at which the Raman active reporter molecules have a net electrical charge of between 0 and 0.3 in the tubing connecting the tee fitting (113c) to the collecting reservoir (114c) of the continuous flow reactor a first colloid provided by the pressurized tank (112c) and consisting essentially of nanoparticles with a plasmonic surface and substantially same size (130c) dispersed in an aqueous solvent (not shown), wherein the nanoparticles have adsorbed on their surface a stabilizing agent (not shown), with a second colloid (120c) provided by the pressurized tank (111c) and consisting essentially of nanoparticles with a plasmonic surface and substantially same size (121c) dispersed in an aqueous solvent (not shown), wherein said nanoparticles have adsorbed on their surface Raman active reporter molecules (122c) and a stabilizing agent (not shown). The mixing at a pH comprised between about 2.2 and the lowest pH value at which the Raman active reporter molecules have a net electrical charge of between 0 and 0.3 induces nanoparticles aggregation. The aggregation step is stopped by introducing water stored in the pressurized tank (150c) into the tubing leading to the collecting reservoir (114c) so as to dilute the colloid, by introducing a basic solution stored in the pressurized tank (150c) into the tubing leading to the collecting reservoir (114c), by introducing a polymer stored in the pressurized tank (150c) into the tubing leading to the collecting reservoir (114c), or by introducing a dielectric material precursor stored in the pressurized tank (150c) into the tubing leading to the collecting reservoir (114c), thereby providing the target SERS tags (140c).
Figure 2A:
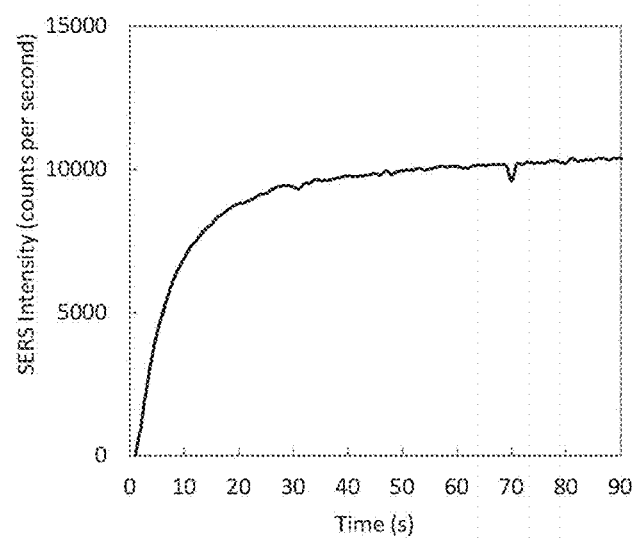
FIG. 2a-c illustrate the variation of SERS signal intensity with the aggregation reaction time.
Figure 2B:
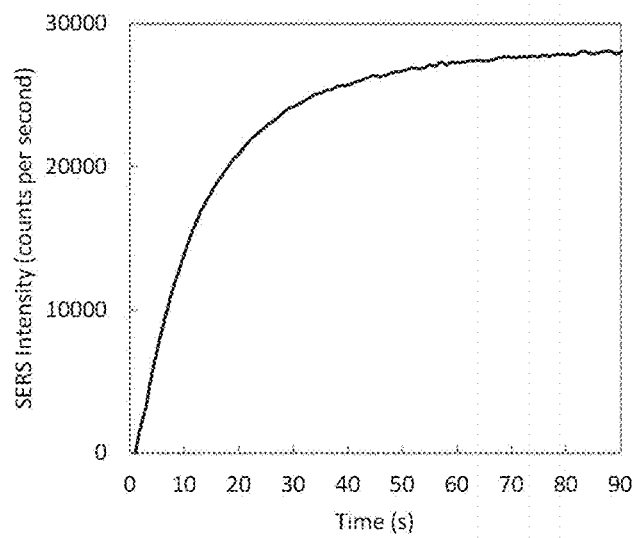
Figure 2C:
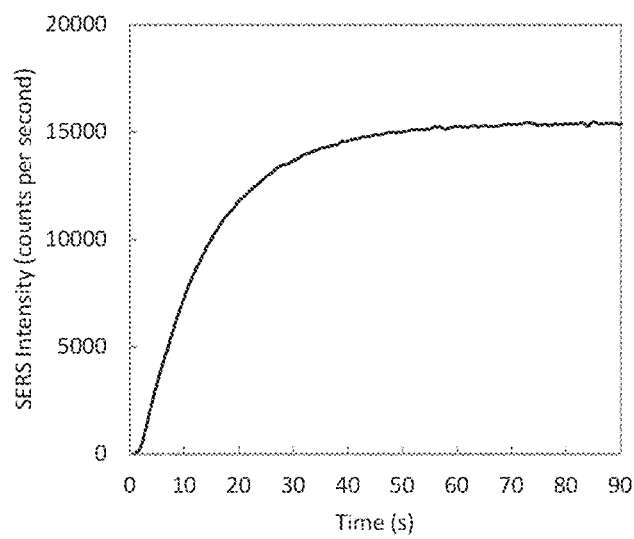

In a further preferred embodiment, steps c) and d) of the manufacturing method claimed herein are conducted simultaneously in a continuous flow system. In this specific manufacturing method, a continuous flow reactor is used. Such continuous flow reactor is schematically represented in FIG. 1b and FIG. 1c and comprises two pressurized tanks (111b, 112b, 111c, 112c) connected via a tubing to a tee fitting (113b, 113c) and a collecting reservoir (114b, 114c). The second colloid is stored in the pressurized tank (111b, 111c), while the first colloid is stored in the pressurized tank (112b, 112c). A vessel open to the atmosphere (114b, 114c) is used to collect the SERS tags and optionally to stop aggregation (114c). A tubing connecting each of the pressurized tanks (111b, 112b, 111c, 112c) to the tee fitting (113b, 113c) is used for colloids transport. A further tubing connecting the tee fitting (113b, 113c) to the collection vessel (114b, 114c) is used for conducting aggregation. The nanoparticles aggregates obtained via aggregation are collected in the collection vessel (114b), where the aggregation is stopped.

When steps c) and d) of the manufacturing method are conducted simultaneously in a continuous flow system, it is further preferred that step e) is also conducted in a continuous flow system.

As mentioned above, the nanoparticles used in the manufacturing method of SERS tags may have any shape capable of being produced, such as sphere, spheroid, rod, disk, prism and cube. Preferably, the shape of the nanoparticles having a plasmonic surface used in the inventive manufacturing method claimed herein is selected from a sphere and a spheroid. Even more preferably said nanoparticles have a spheroid shape.

In a preferred embodiment, the nanoparticles of the first colloid and the nanoparticles of the second colloid have the same size. Conveniently, for such manufacturing method of SERS tags the colloid used for the preparation of the second colloid (i.e. the colloid provided at step b1)) is the first colloid.

Figure 3A:
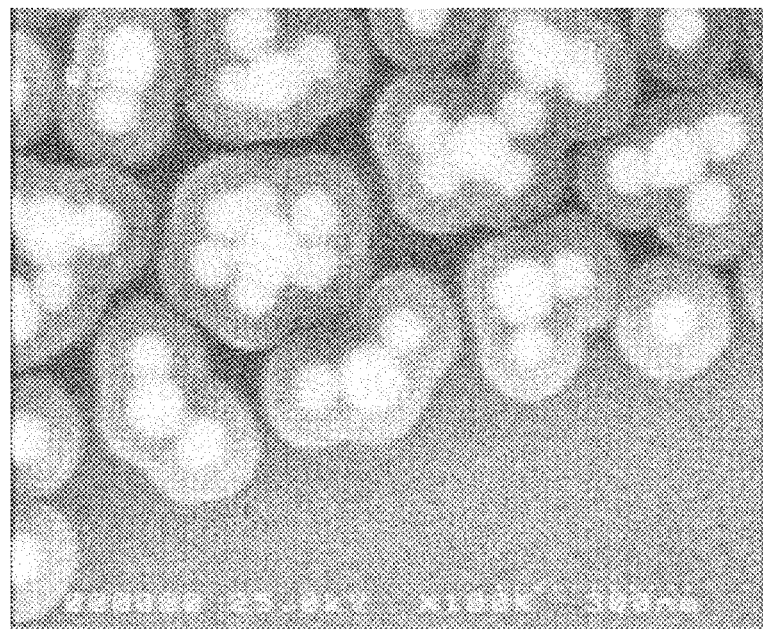
FIG. 3a-b present SEM images taken of SERS tags containing nanoparticles of different sizes manufactured according to Examples E9 (FIG. 3a) and 10 (FIG. 3b). As attested by the SEM images, the SERS tags manufactured according to the present invention are enriched in low-number aggregates, such as dimers, trimers and tetramers, and present a narrow size distribution.

In an alternative embodiment, the nanoparticles size of the first colloid is different from the nanoparticles size of the second colloid. For example, the size of the nanoparticles in the first colloid may be lower than the size of the nanoparticles in the second colloid resulting in SERS tags having structures similar to the SERS tags depicted by FIG. 3a, or the size of the nanoparticles in the first colloid may be bigger than the size of the nanoparticles in the second colloid resulting in SERS tags having structures similar to the SERS tags depicted by FIG. 3b.

The manufacturing method claimed herein is preferably conducted with colloids, wherein the plasmonic surface of the nanoparticles in the first colloid and/or the plasmonic surface of the nanoparticles in the second colloid is made of gold, more preferably with colloids comprising solid gold nanoparticles, and even more preferably with citrate stabilized gold colloids.

EXAMPLES

The present invention is now described in greater detail with respect to the following non-limiting examples.

General

The following reagents were obtained from the following suppliers:

Gold chloroaurate trihydrate (>99.9%; CAS no.: 16961-25-4), sodium borohydride (99.99%; CAS no.: 16940-66-2), sodium citrate tribasic dihydrate (≥99.5%; CAS No.: 6132-04-3), (E)-1,2-di(pyridin-4-yl)ethene (97%; CAS No.: 13362-78-2), 5-(pyridin-4-yl)-1,3,4-oxadiazole-2-thiol (97%; CAS no.: 15264-63-8), sodium hydroxide (ACS reagent, ≥97%; CAS No.: 1310-73-2), hydroxylamine hydrochloride (99.999%; CAS No.: 5470-11-1), terephthalaldehyde (ReagentPlus, 99%, CAS No.: 623-27-8), 4-methylpyridine (99%; CAS No.: 108-89-4), acetic anhydride (ReagentPlus, ≥99%; CAS No.: 108-24-7), dichloromethane (anhydrous, 99.8%; CAS No.: 75-09-2), and methanol (HPLC, ≥99.9%; CAS No.: 67-56-1) were purchased from Sigma Aldrich. Hydrochloric acid (trace metal grade, 34-37%; CAS No.: 7647-01-0) was purchased from Fisher Scientific.

The ζ-potential values were measured using a Malvern Zetasizer Nano-ZS with 1 mL folded capillary cells (DTS1060). Optical absorption spectra were recorded on an Agilent 8453 spectrophotometer and on a Perkin Elmer Lambda 650.

Scanning electron microscope (SEM) images were taken on a Hitachi S-4500.

785 nm Raman spectra were obtained on Ocean Optics QE 6500.

The nominal 140 nm gold colloid particles were sized by sending a sample to EAG Laboratories for transmission electron microscopy (TEM) imaging. The images were analyzed with ImageJ software (https://imagej.nih.gov/ij/). A batch was considered to be nominally 140 nm, if the number average particle size was within ±9 nm of the nominal diameter, wherein the number average particle size was determined by the measurement of 230 individual particles in TEM micrographs. The size-related characteristic selected for describing the individual particles was the "circle equivalent" (CE) diameter, which corresponds to the diameter of a circle that would have the same area as an orthographic projection of the particle.

The gold nanoparticle diameter d (nm) for the 40, 60, 90 nm nanoparticle batches were calculated by the method of Haiss and coworkers (*Anal. Chem.* 2007, 79, 4215-4221) using the equation $$d = \frac{\ln\frac{\lambda_{spr} - 512 \text{ nm}}{6.53}}{0.0216} \text{ nm}$$

where $\lambda_{spr}$ is the surface plasmon resonance peak position in the extinction plot taken of the colloid sample on a Perkin Elmer Lambda 650 UV Vis. A batch was considered to be nominally 40 nm, 60 nm or 90 nm, if the surface plasmon resonance peak position correlated to a diameter within ±9 nm of the nominal diameter.

I. Preparation of Au Colloid Stock Solution (S1-S4)

The gold colloid stock solutions (S1-S4) characterized by the Au nanoparticle size (nm), the Au concentrations (mg/mL) and the pH values indicated in Table 1 were manufactured as described below:

I.1 Preparation of 40 nm Gold Colloid Stock Solution (S1)

In a jacketed thoroughly cleaned 100 L glass reactor (ChemGlass), 79.51 l of 17 MΩ water was chilled to 3.5±0.5° C. Gold chloroaurate trihydrate (100 g) as a 20 wt % solution in water was added while stirring with an impeller at 400 rpm. Sodium citrate tribasic dihydrate (174.3 g) as a 30 wt % solution in water and hydroxylamine hydrochloride (155.6 g) as a 23.5 wt % solution in water were combined and added to the reactor. After 10 s, 800 µL of sodium borohydride as a 0.063 wt % solution in 0.01 N sodium hydroxide was injected into the reactor. The reagents were allowed to react for 2 minutes, and then drained into a clean drum to provide a 40 nm Au colloid stock solution (S1) having a gold concentration of 0.25 mg Au/mL and a pH value of about 2.4.

I.2 Preparation of 60 nm Gold Colloid Stock Solution (S2)

In a jacketed thoroughly cleaned 100 L glass reactor (ChemGlass), 79.5 l of 17 MΩ water was chilled to 3.5±0.5° C. Gold chloroaurate trihydrate (200 g) as a 20 wt % solution in water was added while stirring with an impeller at 400 rpm. Sodium citrate tribasic dihydrate (173.3 g) as a 30 wt % solution in water and hydroxylamine hydrochloride (217.1 g) as a 17.5 wt % solution in water were combined and added to the reactor. After 10 s, 800 µL of sodium borohydride as a 0.052 wt % solution in 0.01 N sodium hydroxide was injected into the reactor. The reagents were allowed to react for 2 minutes, and then drained into a clean drum. The batch was diluted with 17 MΩ water to 160 L to give a 60 nm Au colloid stock solution (S2) having a gold concentration of 0.25 mg Au/ml and a pH of about 2.4.

I.3 Preparation of 90 nm Gold Colloid Stock Solution (S3)

In a jacketed thoroughly cleaned 100 L glass reactor (ChemGlass), 79.5 l of 17 MΩ water was chilled to 3.5±0.5° C. Gold chloroaurate trihydrate (200 g) as a 20 wt % solution in water was added while stirring with an impeller at 400 rpm. Sodium citrate tribasic dihydrate (173.3 g) as a 30 wt % solution in water and hydroxylamine hydrochloride (217.1 g) as a 17.5 wt % solution in water were combined and added to the reactor. After 10 s, 900 µl of sodium borohydride as a 0.01 wt % solution in 0.01 N sodium hydroxide was injected into the reactor. The reagents were allowed to react for 2 minutes, and then drained into a clean drum. The batch was diluted with 17 MΩ water to 160 L to give a 90 nm Au colloid stock solution (S3) having a gold concentration of 0.25 mg Au/mL and a pH of about 2.4.

I.4 Preparation of 140 nm Gold Colloid Stock Solution (S4)

In a 2 L glass jug, 1.5 l of 17 MΩ water was stirred at room temperature. Gold chloroaurate trihydrate (2.5 g) as a 20 wt % solution in water was added while stirring. Sodium citrate tribasic dihydrate (15.37 g) as a 30.7 wt % solution in water and hydroxylamine hydrochloride (8.37 g) as a 16.7 wt % solution in water were combined and added to the reactor. After 5 s, 25 µL of sodium borohydride as a 0.01 wt % solution in 0.01 N sodium hydroxide was injected into the reactor. Additional stirring for 15 minutes provided a 140 nm Au colloid stock solution (S4) having a gold concentration of 0.25 mg Au/mL and a pH of about 2.4.

TABLE 1

Characterization of the Au colloid stock solutions (S1-S4).

| Au colloid stock solution no.: | Au nanoparticles size (nm) | Au concentration (mg/mL) | pH |
|---|---|---|---|
| S1 | 40 | 0.25 | ≈2.4 |
| S2 | 60 | 0.25 | ≈2.4 |
| S3 | 90 | 0.25 | ≈2.4 |
| S4 | 140 | 0.25 | ≈2.4 |

II. Preparation of a First Colloid (A1-A9) (Step a) of the Manufacturing Method First colloids (A1-A9) were obtained starting from Au colloid solutions S1, S2 and S4. If necessary (for e.g.: Au colloids A1 and A7) the Au colloid stock solutions were diluted with deionized water so that to obtain the Au concentration (mg/mL) indicated in Table 2. Further, if necessary (for e.g.: Au colloids A3, A4, A5, A6, A8, A9), the Au colloid stock solutions per se or after dilution are treated with an aqueous 0.1 mM solution of NaOH or an aqueous 0.1 mM solution of HCl so that to adjust the pH value of the first colloids to the pH value indicated by Table 2.

TABLE 2

Characterization of the first colloids (A1-A9).

| Au colloid stock solution no.: | Au nanoparticles size (nM) | Au concentration (mg/mL) | pH value |
|---|---|---|---|
| A1 | 60 | 0.10 | ≈2.5 |
| A2 | 60 | 0.25 | ≈2.4 |
| A3 | 60 | 0.25 | ≈3.0 |
| A4 | 60 | 0.25 | ≈1.7 |
| A5 | 60 | 0.25 | ≈8.8 |
| A6 | 60 | 0.25 | ≈4.2 |
| A7 | 140 | 0.10 | ≈2.4 |
| A8 | 40 | 0.25 | ≈4.2 |
| A9 | 60 | 0.25 | ≈6.0 |

Only stable first colloids i.e. colloids where no aggregation occurs are suitable to be used in the manufacturing method according to the present invention. First colloids A1-A9 are stable i.e. no aggregation of the Au nanoparticles could be identified by visual detection of a change of color from pink to purple. Further, as attested by FIG. 4, a variety of Au colloids characterized by a zeta-potential value lower than or equal to −25 mV measured as described at item IV below are stable. Therefore, such Au colloids are also useful as first colloids in the manufacturing method according to the present invention.

III. Preparation of a Second Colloid Containing Au Nanoparticles and Raman Active Reporter Molecules Adsorbed on the Surface of Au Nanoparticles (D1-D11) (Step b) of the Manufacturing Method Au colloids (B1-B8) characterized by the Au concentrations (mg/mL) and the pH values indicated in Table 3 were prepared starting from the Au colloid stock solutions S1-S3. The preparation involves, if necessary (for e.g.: Au colloids B1 and B5) dilution of the Au colloid stock solutions with deionized water so that to obtain the indicated Au concentration (mg/mL), and adjustment of the pH value by addition of an aqueous 1 M NaOH solution to the Au colloid stock solutions per se or after dilution.

TABLE 3

Characterization of Au colloids B1-B9.

| Au colloid no.: | Au nanoparticles size (nM) | Au concentration (mg/mL) | pH value |
|---|---|---|---|
| B1 | 60 | 0.10 | ≈11.2 |
| B2 | 60 | 0.25 | ≈11.2 |
| B3 | 60 | 0.25 | ≈9.8 |
| B4 | 60 | 0.25 | ≈12.1 |
| B5 | 90 | 0.10 | ≈11.0 |
| B6 | 60 | 0.25 | ≈7.1 |
| B7 | 60 | 0.25 | ≈5.1 |
| B8 | 40 | 0.25 | ≈11.0 |
| B9 | 60 | 0.25 | ≈8.2 |

The Raman active reporter molecule 1,4-bis((E)-2-(pyridin-4-yl)vinyl)benzene was synthesized as described below:

In a 50 ml round bottom flask with a stir bar was charged terephthalaldehyde (3.44 g, 25.7 mmol), 4-methylpyridine (9.57 g, 103 mmol), and acetic anhydride (25 mL). The mixture was refluxed until no more aldehyde was present (4 h, checked by TLC). The reaction was cooled to room temperature and quenched by pouring it into 100 ml ice water. The cold mixture was neutralized to pH 7 using an aqueous 6 N solution of NaOH and the resulting brown precipitate was filtered, washed with water and air dried. Extraction with dichloromethane, followed by solvent concentration to dryness provided the crude product that was purified by flash column chromatography on silica gel (methanol/dichloromethane: 5/95) to afford 0.875 g of the target Raman active reporter molecule as a yellow solid (12%).

The second colloid (D1-D11) containing Au nanoparticles having adsorbed on their surface Raman active reporter molecules was prepared by adding a volume of 0.1 mM Raman active reporter molecule solution in ethanol to 20 mL Au colloid (B1-B5, B9) or 3 L Au colloid (B8), followed by stirring of the resulting mixture for 30 min (second colloid D1-D7, D9-D11)/1 h (second colloid D8) at room temperature. Table 4 provides a summary of the Raman active reporter molecules and volumes of Raman active reporter molecule solution in ethanol used for the preparation of the second colloid D1-D11.

TABLE 4

Preparation of the second colloids D1-D11.

| Second colloid no.: | Starting Au colloid | Raman active reporter molecule | Volume 0.1 mM Raman active reporter molecule solution |
|---|---|---|---|
| D1 | B1 | (E)-1,2-di(pyridin-4-yl)ethene | 300 µL |
| D2 | B2 | (E)-1,2-di(pyridin-4-yl)ethene | 750 µL |
| D3 | B3 | (E)-1,2-di(pyridin-4-yl)ethene | 750 µL |
| D4 | B4 | (E)-1,2-di(pyridin-4-yl)ethene | 750 µL |
| D5 | B2 | 5-(pyridin-4-yl)-1,3,4-oxadiazole-2-thiol | 750 µL |
| D6 | B2 | 1,4-bis((E)-2-(pyridin-4-yl)vinyl)benzene | 750 µL |
| D7 | B5 | (E)-1,2-di(pyridin-4-yl)ethene | 240 µL |
| D8 | B8 | (E)-1,2-di(pyridin-4-yl)ethene | 127.5 mL |
| D9 | B9 | (E)-1,2-di(pyridin-4-yl)ethene | 750 µL |
| D10 | B1 | 1,4-bis((E)-2-(pyridin-4-yl)vinyl) benzene | 300 µL |
| D11 | B1 | 5-(pyridin-4-yl)-1,3,4-oxadiazole-2-thiol | 300 µL |

Treatment of 20 ml of the Au colloids B6 and B7 having a pH value lower than the lowest pH value at which (E)-1,2-di(pyridin-4-yl)ethene carry no net electrical charge as predicted by Chemicalize.com with 750 µL of a 0.1 mM solution of (E)-1,2-di(pyridin-4-yl)ethene in ethanol, followed by stirring of the resulting mixture for 30 min at room temperature resulted in unstable colloids as indicated by visual detection of a color change from pink to purple of the mixture during stirring. Unstable colloids cannot be used in the manufacturing method according to the present invention. To ensure the stability of the second colloid i.e. to avoid aggregation of the Au nanoparticles contained in said colloid, it is important that during preparation and storage of said colloid the ζ-potential value is lower than or equal to −25 mV and the pH value is higher than the lowest pH value at which the Raman active reporter molecule to be adsorbed on the Au nanoparticles carry no net electrical charge, wherein said value can be predicted for example with Chemicalize.com. In this sense, the pH value of the Au colloid (B1-B5, B8, B9) used for the preparation of the second colloid is adjusted before treatment with the Raman active reporter molecule to a value higher than the lowest pH value at which the Raman active reporter molecule to be adsorbed on the Au nanoparticles contained by the Au colloid (B1-B5, B8, B9) carry no net electrical charge, wherein said value can be predicted for example with Chemicalize.com.

IV. Stability of the First and Second Colloids

Figure 4:
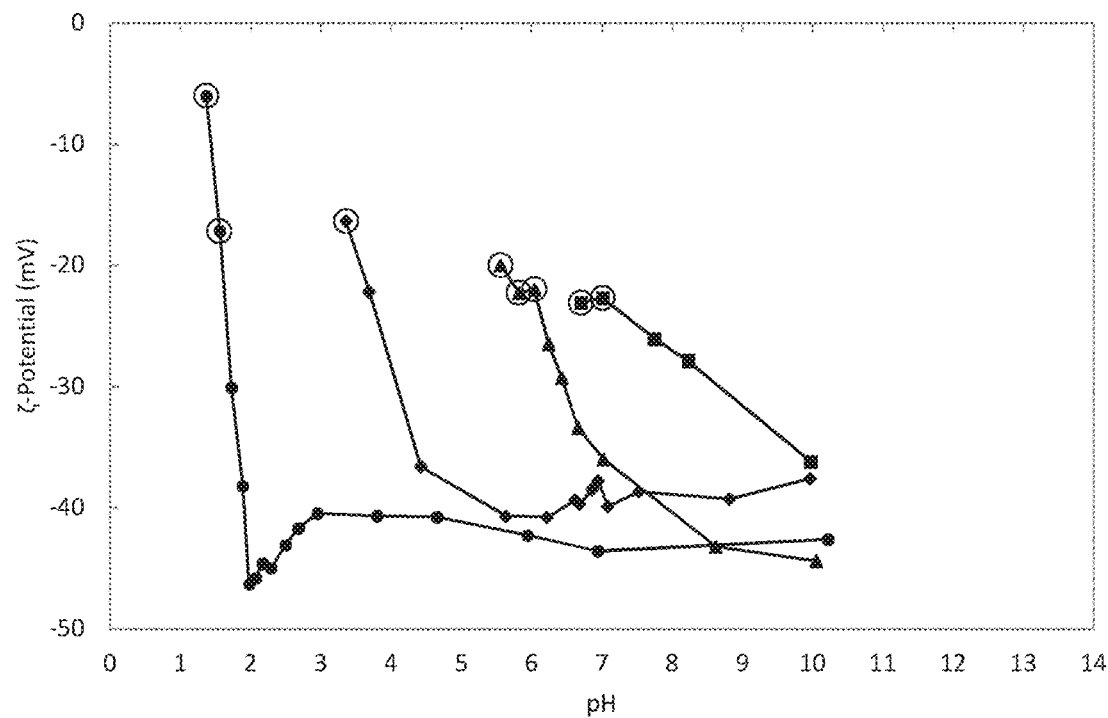
FIG. 4 is a plot illustrating the $\zeta$-potential value of first colloid A2 (plotted as solid circles) and second colloids D2 (plotted as solid triangles), D5 (plotted as solid diamonds) and D6 (plotted as solid squares), when said colloids are titrated with an aqueous solution of 1N HCl or an aqueous solution of 1 N NaOH. The horizontal axis corresponds to the pH value, and the vertical axis corresponds to the $\zeta$-potential value (mV). The conditions in which aggregation was observed (i.e. the colloids are unstable) are circled. As attested by FIG. 4 a variety of colloids characterized by a $\zeta$-potential value lower than −25 mV are stable. Such colloids can be used as first and second colloids, respectively in the manufacturing method according to the present invention.

To be suitable for use in the manufacturing method according to the present invention providing SERS tags with high population of low-size aggregates, the first and second colloids must be stable i.e. during preparation and storing of said colloids, nanoparticles aggregation of the nanoparticles must be avoided. This can be ensured by maintaining the ζ-potential value of said colloids at a value lower than or equal to −25 mV. As shown by FIG. 4 and Table 5, a variety of Au colloids can be used as first and second colloids in the manufacturing method of SERS tags according to the present invention.

The ζ-potential of the first colloid A2 and second colloids D2, D5 and D6 was measured as a function of pH at a concentration of 0.05 mg Au/mL at room temperature. The results are reported in Table 5 and plotted in FIG. 4.

The ζ-potential measurements were made on a Malvern Zetasizer Nano-ZS with 1 mL folded capillary cells. The physical properties of water at 25° C. and gold were preloaded on the instrument First colloid A2 and second colloids D2, D5 and D6 were each diluted with deionized water to a concentration of 0.05 mg Au/mL.

The ζ-potential values of the first colloid A2 and of the second colloid D2, D5 and D6 at about the pH used for the SERS tags synthesis according to the invention are reported in the $2^{nd}$ column of Table 5. The ζ-potential values of the first colloid A2 and of the second colloid D2, D5 and D6 at the pH at which the colloids become unstable are reported in the $3^{rd}$ column of Table 5. Instability of the colloid was determined by visual detection of a color change of the colloid from pink to purple.

TABLE 5

ζ-potential measurements of first and second colloids.

| Au-colloid no. diluted at 0.05 mg Au/mL [Au-concentration] | ζ-potential after dilution (pH after dilution) | ζ-potential at which the Au colloid becomes unstable (pH at which the Au colloid becomes unstable) |
|---|---|---|
| A2 | −43 mV (at pH ≈2.5) | −17 mV (at pH ≈1.6) |
| D2 | −44 mV (at pH ≈10) | −22 mV (at pH ≈6) |
| D5 | −38 mV (at pH ≈10) | −16 mV (at pH ≈3.4) |
| D6 | −36 mV (at pH ≈10) | −23 mV (at pH ≈7) |

V. Combining First Colloid and Second Colloid, Inducing Aggregation and Stopping Aggregation (Steps c), d) and e) of the Manufacturing Method)

V.1 SERS Tags Containing Au Nanoparticles Having the Same Size (Examples E1-E8, E12-E14)

V.1.a Batch Aggregation (Examples E1-E7, E12-E14)

The second colloid (D1-D6, D9-D11, 20 mL) was quickly poured to 80 mL of the first colloid (A1-A5, A9) and the mixture was stirred in a mixing reservoir with a magnetic stirrer bar. 30 sec after colloids combination, a 125 µL aliquot was sampled and diluted to 1 mL with water, thereby stopping aggregation. At this dilution (12.5 µg Au/mL corresponding to about $5.72*10^9$ Au nanoparticles/mL) aggregation ceased, and the SERS signal was measured using 785 nm laser excitation and a QE65000 spectrometer purchased from Ocean Optics Inc. set to one second integration time. The results of the SERS signal measurements conducted on the SERS tags manufactured as described above are depicted in Table 6.

As attested by the examples E1-E7, and E12-E14 according to the inventive method claimed herein, and the comparative examples C1-C3, selective aggregation of the particles of the first colloid and the particles of the second colloid does not occur at low pH value such as 1.8 and at pH values higher than the lowest pH value at which the Raman active reporters molecules have a net electrical charge of between 0 and 0.3, as predicted by Chemicalize.com.

the value obtained from a 50 µL aliquot that was sampled at the tube opening and diluted to 1 mL with water (12.5 µg Au/mL) i.e. to a sample where the aggregation was stopped by dilution with water and measured using 785 nm laser excitation and an Ocean Optics QE65000 spectrometer set to one second integration time. The results of the SERS mea-

TABLE 6

SERS signal intensity exhibited by the SERS tags according to Examples E1-E7, E12 and comparative examples C1-C3.

| Example Number | First colloid no.: | Second colloid no.: | Ratio between the number of nanoparticles of the first colloid and the number of nanoparticles of the second colloid | pH colloid obtained by mixing first and second colloid | SERS Signal Intensity at 12.5 µg Au/mL [cps ± 500] |
|---|---|---|---|---|---|
| E1  | A1 | D1  | ≈4:1 | ≈2.9 | 9385 |
| E2  | A2 | D2  | ≈4:1 | ≈2.6 | 14321 |
| E3  | A3 | D2  | ≈4:1 | ≈3.2 | 17091 |
| E4  | A2 | D3  | ≈4:1 | ≈3.3 | 7248 |
| E5  | A3 | D4  | ≈4:1 | ≈5.7 | 14598 |
| E12 | A2 | D9  | ≈4:1 | ≈2.6 | 11109 |
| C1  | A4 | D2  | ≈4:1 | ≈1.8 | 3270 (no aggregation) |
| C2  | A9 | D2  | ≈4:1 | ≈6.5 | 512 (no aggregation) |
| C3  | A5 | D2  | ≈4:1 | ≈9.9 | 373 (no aggregation) |
| E6  | A2 | D5  | ≈4:1 | ≈2.6 | 15617 |
| E13 | A1 | D11 | ≈4:1 | ≈2.9 | 13654 |
| E7  | A2 | D6  | ≈4:1 | ≈2.6 | 28993 |
| E14 | A1 | D10 | ≈4:1 | ≈2.9 | 24196 |

V.1.b Continuous Flow System Aggregation (Example E8)

A schematic of the continuous flow reactor used in the manufacturing method according to the present invention is presented in FIG. 1b. A pressurized tank (111b) holds the second colloid, and a second pressurized tank (112b) holds the first colloid. A vessel opened to the atmosphere (114b) is used to collect the SERS tags and contains a concentrated polymer solution for stopping the aggregation reaction. Transparent fluorinated ethylene propylene (FEP) from Cole Parmer® Scientific Experts tubing with 8 mm nominal internal diameter is used for colloid transport 30 cm of the FEP tubing was used to connect the pressurized tank (111b) to the T-junction (113b). 30 cm of the FEP tubing was used to connect the pressurized tank (112b) to the T-junction (113b). 7 m of FEP tubing was used to connect the T-junction (113b) to the collection vessel (114b). This section of tubing between the T-junction (113b) and the collection vessel (114b) is the section in which aggregation occurs.

Figure 5:
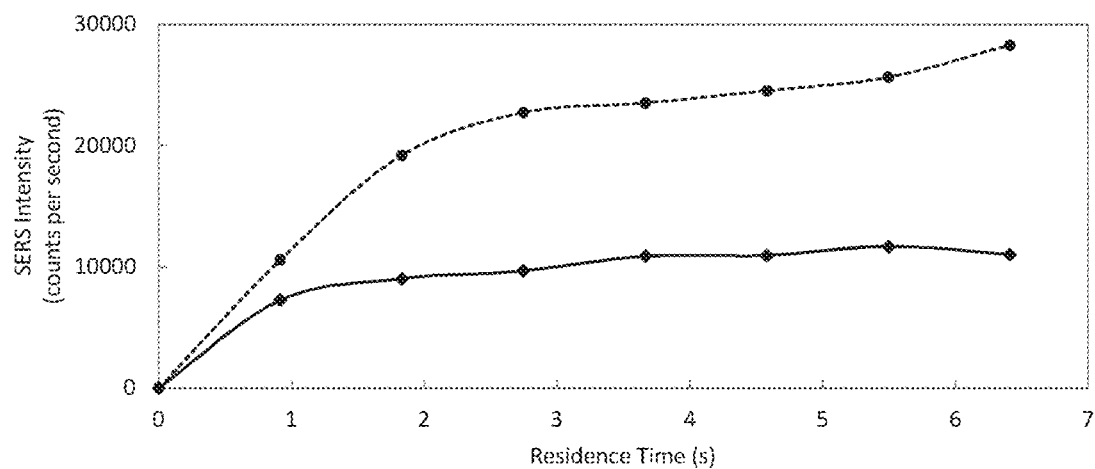
FIG. 5 illustrates the development of the SERS signal intensities of colloids aggregating in a flow system. Each measurement was taken at 1 meter markings along a 7 m long, transparent PEP tube. The data represented by diamonds connected by a solid line were taken on the SERS tags produced as described by Example E8. The data represented by circles connected by a dotted line were taken on the SERS tags produced as described by Example E11.

Colloids A8 (12 L) and D8 (3 L) described above were placed in tanks 112b and 111b, respectively. The tank (111b) containing second colloid (D8) was pressurized such that the colloid flowrate was 0.66 L/min. The tank (112b) containing the first colloid (A8) was pressurized such that the colloid flowrate was 2.65 L/min. After combining at the T-junction, the combined colloid, characterized by a ratio between the number of nanoparticles of the first colloid A8 and the number of nanoparticles of the second colloid D8 is of ≈4:1, has a pH value of about 4.8 and a flow rate in the aggregation tubing of 3.31 L/min, giving a linear velocity of 1.1 m/s. SERS measurements were taken through the transparent FEP tubing at 1 m markings down the length of the aggregation tubing with a probe coupled with a fiber optic cable to a Ocean Optics QE65000 spectrometer with 785 nm excitation. The integration time was shortened such that the measurement at marking at the end of the tube was equal to the value obtained from a 50 µL aliquot that was sampled at the tube opening and diluted to 1 mL with water (12.5 µg Au/mL) i.e. to a sample where the aggregation was stopped by dilution with water and measured using 785 nm laser excitation and an Ocean Optics QE65000 spectrometer set to one second integration time. The results of the SERS measurements are plotted in FIG. 5 as diamonds connected by a solid line. The SERS signal intensity from the sample taken at the end of the tube and measured at 12.5 µg Au/mL was 11044 counts per second [±500].

V.2 First Colloid and Second Colloid Contain Au Nanoparticles of Different Sizes (Examples E9-E11)

V.2.a Batch Aggregation (Examples E9 and E10)

Example E9

Second colloid (D7, 30 mL) was quickly poured into first colloid (A1, 55 mL) and the mixture was stirred in the mixing reservoir with a magnetic stirrer bar. The ratio between the number of the nanoparticles of the first colloid and the number of nanoparticles of the second colloid is ≈6.3:1. After 30 s of mixing at a pH of approximately 2.9, aggregation was stopped by the addition of a polymer solution, and the resulting aggregates were further silica coated following the method described in U.S. Pat. No. 8,497,131B2 to provide the target SERS tags. ~2 µL aliquots of the SERS tags were dropped onto silica wafer pieces and dried. The sample was imaged on a Hitachi S-4500 field emission SEM and shown in FIG. 3a. The SERS signal was measured using 785 nm laser excitation and a QE65000 spectrometer purchased from Ocean Optics Inc. set to one second integration time. The SERS signal intensity measured at 12.5 µg Au/mL was 18377 counts per second [±500].

Example E10

Second colloid (D7, 20 mL) was quickly poured into the first colloid (A7, 200 mL) and the mixture was stirred in the mixing reservoir with a magnetic stirrer bar. The ratio between the number of the nanoparticles of the first colloid and the number of nanoparticles of the second colloid is ≈2.65:1.

Figure 3B:
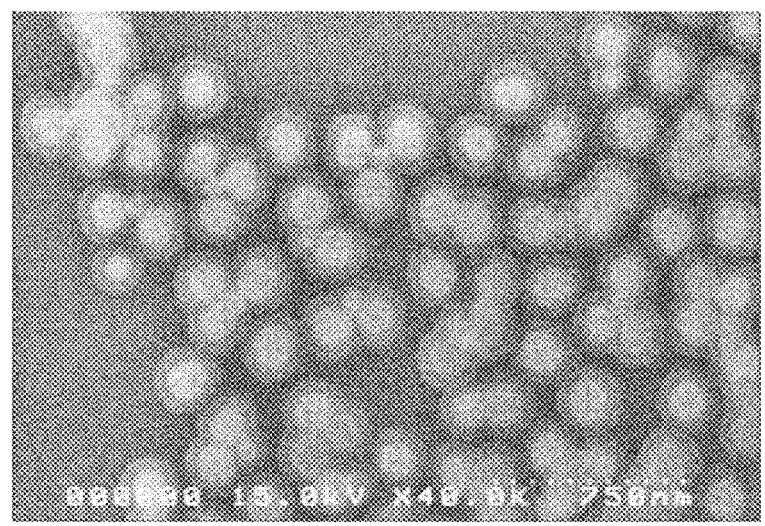

After 30 s of mixing at a pH of approximately 2.9, aggregation was stopped by the addition of a polymer solution, and the resulting aggregates were silica coated following the method described in U.S. Pat. No. 8,497,131B2 to provide the target SERS tags. ~2 µL aliquots of the SERS tags were dropped onto silica wafer pieces and dried. The sample was imaged on a Hitachi S-4500 field emission SEM and is shown in FIG. 3b.

V.2.b Flow System Aggregation (Example E11)

A schematic of the continuous flow reactor used in the manufacturing method according to the present invention is presented in FIG. 1b. A pressurized tank (111b) holds the second colloid, and a second pressurized tank (112b) holds the first colloid. A vessel open to the atmosphere (collecting reservoir, 114b) is used to collect the SERS tags and to stop aggregation. Fluorinated ethylene propylene (FEP) from Cole Parmer® Scientific Experts tubing with 8 mm nominal internal diameter is used for colloid transport. 30 cm of transparent FEP tubing was used to connect the pressurized tank (111b) to the T-junction (113b). 30 cm of FEP tubing was used to connect the pressurized tank (112b) to the T-junction (113b). 7 m of FEP tubing was used to connect the T-junction (113b) to the collection vessel (114b). This section of tubing between the T-junction (113b) and the collection vessel (114b) is the section in which aggregation occurred.

The colloids A6 (12 L) and D8 (3 L) described above are placed in tanks 112b and 111b, respectively. The tank (111b) containing second colloid (D8) was pressurized such that the colloid flowrate was 0.66 L/min. The tank (112b) containing the first colloid (A6) was pressurized such that the activated colloid flowrate was 2.65 L/min. After combining at the T-junction, the combined colloid, characterized by a ratio between the number of nanoparticles of the first colloid A6 and the number of nanoparticles of the second colloid D8 is of ≈1.2:1, has a pH of about 4.8 and a flow rate in the aggregation tubing of 3.31 L/min, giving a linear velocity of 1.1 m/s. SERS measurements were taken through the transparent FEP tubing at 1 m markings down the length of the aggregation tubing with a probe coupled with a fiber optic cable to an Ocean Optics QE65000 spectrometer with 785 nm excitation. The integration time was shortened such that the measurement at marking at the end of the tube was equal to value obtained from a 50 µL aliquot that was sampled at the tube opening and diluted to 1 mL with water (12.5 µg Au/mL) (step e2) and measured using 785 nm laser excitation and an Ocean Optics QE65000 spectrometer set to one second integration time. The results of these measurements are plotted in FIG. 5 as circles connected by a dotted line. The SERS signal intensity from the sample taken at the end of the tube and measured at 12.5 µg Au/mL was 28303 counts per second [±500].

The invention claimed is:
1. A method for manufacturing surface enhanced Raman spectroscopy (SERS) tags comprising the steps:
 a) providing a first colloid consisting essentially of nanoparticles having a plasmonic surface and substantially same size dispersed in an aqueous solvent, and a stabilizing agent adsorbed on the surface of said nanoparticles, and having a ζ-potential value lower than or equal to −25 mV;
 b) providing a second colloid consisting essentially of nanoparticles having a plasmonic surface and substantially same size dispersed in an aqueous solvent, Raman active reporter molecules adsorbed on the surface of said nanoparticles, and a stabilizing agent adsorbed on the surface of said nanoparticles, and having ζ-potential value lower than or equal to −25 mV;
 c) combining the first colloid with the second colloid so that the ratio between the number of nanoparticles of the first colloid and the number of nanoparticles of the second colloid is between about 25:1 to about 1:1, to provide a third colloid;
 d) inducing aggregation of the nanoparticles by any of the steps d1)-d3) or a combination thereof:
  d1) mixing the third colloid obtained at step c) at a pH comprised between about 2.2 and the lowest pH value at which the Raman active reporter molecules have a net electrical charge of between 0 and 0.3;
  d2) addition of a salt solution to the third colloid obtained at step c);
  d3) addition of a water-miscible solvent to the third colloid obtained at step c); and
 e) stopping aggregation.
2. The method according to claim 1, wherein step b) comprises the following steps conducted in the order b1) to b3):
 b1) providing a colloid consisting essentially of nanoparticles having a plasmonic surface and substantially same size dispersed in an aqueous solvent, and a stabilizing agent adsorbed on the surface of said nanoparticles, and having a ζ-potential value lower than or equal to −25 mV;
 b2) adjusting the pH of the colloid at a value higher than the lowest pH value at which the Raman active reporter molecules to be adsorbed on the surface of the nanoparticles carry no net electrical charge while maintaining the ζ-potential value lower than or equal to −25 mV; and
 b3) adding a solution of the Raman active reporter molecules in a solvent to the colloid obtained at step b2) while maintaining the ζ-potential value lower than or equal to −25 mV.
3. The method according to claim 1, wherein the stabilizing agent is selected from carboxylic acids, carboxylic acid salts, phosphoric acids, phosphoric acid salts, ascorbic acid, ascorbic acid salts, and mixtures thereof.
4. The method according to claim 1, wherein the nanoparticles of the second colloid have absorbed on their surface a sub-monolayer or monolayer of Raman active reporter molecules.
5. The method according to claim 1, wherein at step b3) the solution of the Raman active reporter molecules in a solvent comprises a mixture of two or more different Raman active reporter molecules.
6. The method according to claim 1, wherein at step c) the ratio between the number of nanoparticles of the first colloid and the number of nanoparticles of the second colloid is of between about 4:1 and about 3:1.
7. The method according to claim 1, wherein step d1) further comprises addition of an acid solution to the third colloid obtained at step c) while mixing so that the pH value of the resulting colloid is comprised between about 2.2 and the lowest pH value at which the Raman active reporter molecules have a net electrical charge of between 0 and 0.3.
8. The method according to claim 1, wherein the pH of the first colloid is adjusted so that the pH of the third colloid obtained at step d1) is comprised between about 2.2 and the lowest pH value at which the Raman active reporter molecules have a net electrical charge of between 0 and 0.3.

9. The method according to claim 1, wherein step e) comprises any of the followings steps e1)-e4):
  e1) adjusting the pH of the colloid obtained at step d) at a value higher than the lowest pH value at which the Raman active reporter molecules to be adsorbed on the surface of the nanoparticles carry no net electrical charge;
  e2) diluting the colloid obtained at step d) with water;
  e3) addition of a polymer to the colloid obtained at step d);
  e4) addition of a dielectric material precursor to the colloid obtained at step d).

10. The method according to claim 1, wherein step e) consists essentially of step e3) and the manufacturing method further comprises dilution of the colloid obtained at step e3) with water and/or coating of the SERS tags with a dielectric material.

11. The method according to claim 1, wherein steps c) and d) are conducted simultaneously in a continuous flow system.

12. The method according to claim 11, wherein step e) is conducted in a continuous flow system.

13. The method according to claim 1, wherein the nanoparticles of the first colloid and the nanoparticles of the second colloid have the same size.

14. The method according to claim 1, wherein the nanoparticles size of the first colloid is different from the nanoparticles size of the second colloid.

15. The method according to claim 1, wherein the plasmonic surface of the nanoparticles in the first colloid and/or the plasmonic surface of the nanoparticles in the second colloid is made of gold.

16. The method according to claim 1, wherein in step c) the ratio between the number of nanoparticles of the first colloid and the number of nanoparticles of the second colloid is from about 5:1 to about 1:1.

17. The Method according to claim 1, wherein in step d2), the salt solution is an inorganic salt solution.

18. The method according to claim 2, wherein in step b2) comprises adjusting the pH of the colloid at a value higher than the lowest pH value at which the Raman active reporter molecules to be adsorbed on the surface of the nanoparticles carry no net electrical charge while maintaining the ζ-potential value lower than −40 mV.

* * * * *